(12) United States Patent
Zhang et al.

(10) Patent No.: US 12,052,233 B2
(45) Date of Patent: Jul. 30, 2024

(54) IDENTITY VERIFICATION METHOD FOR NETWORK FUNCTION SERVICE AND RELATED APPARATUS

(71) Applicant: HUAWEI TECHNOLOGIES CO., LTD., Guangdong (CN)

(72) Inventors: Bo Zhang, Shenzhen (CN); Fei Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 324 days.

(21) Appl. No.: 17/512,627

(22) Filed: Oct. 27, 2021

(65) Prior Publication Data
US 2022/0052992 A1 Feb. 17, 2022

Related U.S. Application Data

(63) Continuation of application No. PCT/CN2020/080971, filed on Mar. 24, 2020.

(30) Foreign Application Priority Data

Apr. 28, 2019 (CN) .......................... 201910359634.9
Aug. 16, 2019 (CN) .......................... 201910766373.2

(51) Int. Cl.
*H04L 9/40* (2022.01)
*H04L 67/60* (2022.01)
(52) U.S. Cl.
CPC ........ *H04L 63/0823* (2013.01); *H04L 63/102* (2013.01); *H04L 67/60* (2022.05)
(58) Field of Classification Search
CPC .... H04L 63/0823; H04L 63/102; H04L 67/60
(Continued)

(56) References Cited

U.S. PATENT DOCUMENTS 9,525,690 B2 * 12/2016 Burgess .................. H04L 63/10
10,250,590 B2 * 4/2019 Gryb ..................... H04W 60/00
(Continued)

FOREIGN PATENT DOCUMENTS

CN 104378210 A 2/2015
CN 105122738 A 12/2015
(Continued)

OTHER PUBLICATIONS

Huawei et al.,"Handling for the service access failure",3GPP TSG-SA WG3 Meeting#92 Ad-hoc S3-182902,Sep. 24-28, 2018, Harbin (China),total 4 pages.
(Continued)

*Primary Examiner* — Badrinarayanan
(74) *Attorney, Agent, or Firm* — HUAWEI TECHNOLOGIES CO., LTD.

(57) ABSTRACT

In an identity verification method for a network function service, a network element receives from a requesting network element a network function (NF) service request that includes a token, The token includes first certificate information. The network element verifies the first certificate information to determine whether an identity represented by the first certificate information is consistent with an identity of the requesting network element. When the network element determines that the identity represented by the first certificate information is inconsistent with the identity of the requesting network element, the network element rejects the NF service request.

11 Claims, 19 Drawing Sheets

(58) Field of Classification Search
USPC .......................................................... 726/9
See application file for complete search history.

(56) References Cited

U.S. PATENT DOCUMENTS

| | | | | |
|---|---|---|---|---|
| 10,511,587 | B2* | 12/2019 | Brockhaus | H04L 63/0823 |
| 10,609,070 | B1* | 3/2020 | Farmer, III | H04L 63/126 |
| 2010/0161969 | A1* | 6/2010 | Grebovich | H04L 9/3247 |
| | | | | 713/176 |
| 2010/0306442 | A1* | 12/2010 | Gregg | G06F 13/385 |
| | | | | 710/313 |
| 2017/0141944 | A1* | 5/2017 | Lee | H04L 41/0866 |
| 2017/0148018 | A1* | 5/2017 | Levin | G06Q 20/202 |
| 2021/0112407 | A1* | 4/2021 | Shin | G06F 21/44 |
| 2021/0184854 | A1* | 6/2021 | Pizot | H04L 9/14 |

FOREIGN PATENT DOCUMENTS

| | | |
|---|---|---|
| CN | 106302394 A | 1/2017 |
| CN | 107147611 A | 9/2017 |
| CN | 108347417 A | 7/2018 |
| CN | 108886518 A | 11/2018 |

OTHER PUBLICATIONS

Huawei et al.,"Editorial corrections on Authorization of NF service access",3GPP TSG-SA WG3 Meeting #93 S3-183213, Nov. 12-16, 2018, Spokane, Washington, USA,total 8 pages.

Huawei et al.,"Update on the token verification",3GPP TSG-SA WG3 Meeting#94 S3-190227,Kochi (India), Jan. 28-Feb. 1, 2019,total 6 pages.

Huawei et al.,"Clarification on service authorization and token verification",3GPP TSG-SA WG3 Meeting #94 S3-190440,Kochi (India), Jan. 28-Feb. 1, 2019,total 8 pages.

3GPP TS 33.501 V15.4.0 (Mar. 2019), 3rd Generation Partnership Project;Technical Specification Group Services and System Aspects;Security architecture and procedures for 5G system(Release 15),total 187 pages.

D. Hardt, Ed.,"The OAuth 2.0 Authorization Framework",Request for Comments: 6749,Internet Engineering Task Force (IETF),Oct. 2012,total 76 pages.

3GPP TS 23.502 V16.0.2 (Apr. 2019);3rd Generation Partnership Project;Technical Specification Group Services and System Aspects;Procedures for the 5G System;Stage 2(Release 16);total 419 pages.

E. Rescorla,"HTTP Over TLS",Request for Comments: 2818,Network Working Group,May 2000,total 7 pages.

T. Berners-Lee et al.,"Uniform Resource Identifier (URI): Generic Syntax",Request for Comments: 3986,Network Working Group,Jan. 2005,total 61 pages.

B. Korver,"The Internet IP Security PKI Profile of IKEv1/ISAKMP, IKEv2, and PKIX",Request for Comments: 4945, Network Working Group,Aug. 2007,total 43 pages.

T. Dierks et al.,"The Transport Layer Security (TLS) Protocol Version 1.2",Request for Comments: 5246,Network Working Group,Aug. 2008,total 104 pages.

D. Cooper et al.,"Internet X.509 Public Key Infrastructure Certificate and Certificate Revocation List (CRL) Profile", Request for Comments: 5280,Network Working Group,May 2008,total 151 pages.

M. Jones et al.,"JSON Web Signature (JWS)",Request for Comments: 7515,Internet Engineering Task Force (IETF), May 2015,total 59 pages.

M. Jones et al.,"JSON Web Token (JWT)",Request for Comments: 7519,Internet Engineering Task Force (IETF),May 2015,total 30 pages.

ITU-T X.509,Series X: Data Networks, Open System Communications and Security;Directory; Information technology Open Systems Interconnection the Directory: Public-key and attribute certificate frameworks,(Oct. 2016), total 254 pages.

* cited by examiner

IDENTITY VERIFICATION METHOD FOR NETWORK FUNCTION SERVICE AND RELATED APPARATUS

CROSS-REFERENCE TO RELATED APPLICATIONS

This application is a continuation of International Application No. PCT/CN2020/080971, filed on Mar. 24, 2020, which claims priority to Chinese Patent Application No. 201910766373.2, filed on Aug. 16, 2019, and Chinese Patent Application No. 201910359634.9, filed on Apr. 28, 2019. All of the aforementioned patent applications are hereby incorporated by reference in their entirety.

TECHNICAL FIELD

The present invention relates to the field of communications technologies, and in particular, to an identity verification method for a network function service and a related apparatus.

BACKGROUND

With development of a 5th generation mobile communications technology (5G), a service-based network architecture based on a cloud technology and a virtualization technology and centered on a network function (NF) is proposed in an evolution process of a network architecture of a core network in a 5G network. In this architecture, hardware and software decoupling is implemented on a network element. A software part of the network element is divided into a plurality of NFs. All the NFs are located in a fully interconnected network topology. Decoupling and integration are implemented between NFs through modularization. Network functions obtained after the decoupling are independently expanded, independently evolved, and deployed as required. Interaction between all NFs on a control plane uses a service-based interface. A same type of service may be invoked by a plurality of types of NFs, to reduce a coupling degree defined for an interface between NFs, thereby finally implementing function customization as required in an entire network and flexibly supporting different service scenarios and requirements. This service-based network architecture helps rapidly deploy a new NF to implement network service innovation.

A network function repository function (NRF) is a network function that provides service registration, discovery, and authorization functions for an NF. The NF may request authorization from the NRF to obtain a token corresponding to a service. The token is used to indicate that the NF has permission to view or operate the corresponding service. The NF requests the service from another NF (an NF that has the service) based on the token. After the another NF successfully verifies the token, the another NF returns a service response.

In research practice, the inventor of this application finds that an attacker can also obtain the service from the another NF based on a valid token after the attacker steals the token, thereby causing a potential security risk.

SUMMARY

Embodiments of the present invention provide an identity verification method for a network function service and a related apparatus, to verify identity validity of an NF in a process in which the NF obtains a service from another NF, thereby improving service security.

According to a first aspect, an embodiment of the present invention provides an identity verification method for a network function service. The method is described from a side of a second network element. The method includes: The second network element receives a network function (NF) service request from a first network element. The NF service request includes a token (token). The token includes first certificate information. The second network element verifies the first certificate information to determine whether an identity represented by the first certificate information is consistent with an identity of the first network element. When the second network element determines that the identity represented by the first certificate information is inconsistent with the identity of the first network element, the second network element rejects the NF service request.

According to a second aspect, an embodiment of the present invention provides an identity verification method for a network function service. The method is described from a side of a first network element. The method includes: The first network element obtains a token (token) corresponding to an NF service. The token includes first certificate information of a requester of the token. The first network element sends an NF service request to a second network element. The NF service request includes the token. The token is used to trigger the second network element to determine whether an identity represented by the first certificate information is consistent with an identity of the first network element. When an identity of the requester of the token is inconsistent with an identity of the second network element, the first network element receives a reject message from the second network element.

The identity represented by the first certificate information is the identity of the requester of the token (that is, a network element entity that requests authorization of the token from the NRF). The first certificate information may be generated based on a certificate of the requester of the token.

It may be learned that, in this embodiment of the present invention, the token is designed to carry the certificate information, to implement binding between the certificate and the token. The second network element may verify the certificate information carried in the token to determine whether the identity of the requester of the token is consistent with the identity of the first network element, that is, determine whether the token is secure and valid. Therefore, by implementing this embodiment of the present invention, in a process in which the first network element initiates the service request to the second network element, identity validity of a network function service consumer can be verified, thereby improving service security. In addition, a potential security risk is prevented, for example, a risk that an attacker steals the token.

Based on the first aspect or the second aspect, in a possible embodiment, when the second network element determines that the identity represented by the first certificate information is consistent with the identity of the first network element, the second network element continues to process the NF service request. Specifically, when the identity represented by the first certificate information is consistent with the identity of the first network element, the first network element receives an NF service response from the second network element. It may be learned that, by implementing this embodiment of the present invention, normal functions of the first network element and the second network element are not affected while service security is ensured.

Based on the first aspect or the second aspect, in a possible embodiment, before the second network element verifies the first certificate information, the method further includes: The second network element generates second certificate information based on a certificate of the first network element. Correspondingly, that the second network element verifies the first certificate information to determine whether the identity represented by the first certificate information is consistent with the identity of the first network element includes: The second network element verifies whether the first certificate information is the same as the second certificate information. In other words, after receiving the token, the second network element triggers further determining whether the first certificate information is the same as the second certificate information.

In some possible embodiments, when mutual authentication (mutual authentication) is performed between the second network element and the first network element, the first network element may send the certificate of the first network element to the second network element. In some other possible embodiments, alternatively, after mutual authentication (mutual authentication) is performed between the first network element and the second network element, the first network element may send the certificate of the first network element to the second network element. In some other possible embodiments, the certificate of the first network element may be preconfigured in the second network element, and the like.

In some possible embodiments, the first certificate information is generated by a second control plane network element (such as an NRF). A manner in which the second control plane network element generates the first certificate information based on the certificate of the first network element is the same as a manner in which the second network element generates the second certificate information based on the certificate of the first network element.

The first network element may be a service consumer (may be referred to as an NF 1). The second network element may be a service provider (may be referred to as an NF 2).

It may be learned that, in this embodiment of the present invention, the token is designed to carry the certificate information, to implement binding between the certificate and the token. In this way, the NF 2 can not only verify the token, but also generate the certificate information based on the locally stored certificate of the NF 1 to verify the certificate information carried in the token. Therefore, by implementing this embodiment of the present invention, in a process in which the NF 1 obtains a service from the NF 2, identity validity of the NF 1 can be verified, thereby improving service security. In addition, a potential security risk is prevented, for example, a risk that an attacker steals the token.

Based on the first aspect or the second aspect, in a possible embodiment, the first certificate information includes an identifier of the requester of the token, and the second certificate information includes an identifier of the first network element. That the second network element verifies whether the first certificate information is the same as the second certificate information includes: The second network element verifies whether the identifier of the requester of the token is the same as the identifier of the first network element. In other words, after receiving the token, the second network element triggers further determining whether the identifier of the requester of the token is the same as the identifier of the first network element.

In a possible embodiment, the first certificate information includes an NF type of the requester of the token, and the second certificate information includes an NF type of the first network element. That the second network element verifies whether the first certificate information is the same as the second certificate information includes: The second network element verifies whether the NF type of the requester of the token is the same as the NF type of the first network element. In other words, after receiving the token, the second network element triggers determining whether the NF type of the requester of the token is the same as the NF type of the first network element.

It may be learned that, in this embodiment of the present invention, the token is designed to carry the certificate information, to implement binding between the certificate and the token. In this way, the NF 2 can not only verify the token, but also generate the certificate information based on the locally stored certificate of the NF 1 to verify the certificate information carried in the token. In this way, the NF 2 determines whether the identity of the NF 1 and/or the NF type of the NF 1 are/is valid. Therefore, by implementing this embodiment of the present invention, in a process in which the NF 1 obtains a service from the NF 2, identity validity of the NF 1 can be verified, thereby improving service security. In addition, a potential security risk is prevented, for example, a risk that an attacker steals the token.

Based on the first aspect or the second aspect, in a possible embodiment, the first network element is a requester of a service, and the second network element is a first control plane network element (for example, may be an SFSF). The first certificate information includes, for example, an identifier or an NF type of the requester of the token. That the second network element verifies the first certificate information to determine whether the identity represented by the first certificate information is consistent with the identity of the first network element includes: The first control plane network element generates fourth certificate information based on the certificate of the first network element. The first control plane network element verifies whether the first certificate information is the same as the fourth certificate information. If a verification result is that the first certificate information is the same as the fourth certificate information, the first control plane network element determines that the identity of the requester of the token is consistent with the identity of the first network element.

In other words, after receiving the token, the second network element triggers determining whether the first certificate information is the same as the fourth certificate information. The fourth certificate information is generated by the first control plane network element based on the certificate of the first network element.

In a possible embodiment, when the first control plane network element determines that the identity of the requester of the token is consistent with the identity of the second network element, the first control plane network element forwards the NF service request to a network element that serves as a service provider.

It may be learned that, in this embodiment of the present invention, the token is designed to carry the certificate information, to implement binding between the certificate and the token. In this way, the first control plane network element can first use the locally stored certificate of the NF 1 to verify the certificate information carried in the token. If the certificate information carried in the token is valid, the NF 2 continues to verify the token; or otherwise, the NF 2 may reject the NF service request from the NF 1. Therefore, by implementing this embodiment of the present invention, in a process in which the NF 1 obtains a service from the NF 2, identity validity of the NF 1 can be verified, thereby improving service security and reducing power consumption overheads of the NF 2.

Based on the first aspect, in a possible embodiment, the first network element is the requester of the token. Correspondingly, that the first network element obtains the token corresponding to the NF service includes: The first network element sends a token obtaining request to the second control plane network element. The first network element receives the token returned by the second control plane network element. The first certificate information in the token is generated by the second control plane network element based on the certificate of the first network element.

Based on the first aspect or the second aspect, in a possible embodiment, the token includes a claim (claim). In some embodiments of the present invention, the claim may include an instance ID of the NRF, an instance ID of the requester of the token (the requester of the token herein may be the NF 1, or may be not the NF 1), a type of the NF 2, an expected service name, an expiration time, and the first certificate information.

In some other embodiments of the present invention, the claim may include an instance ID of the NRF, an instance ID of the requester of the token (the requester of the token herein may be the NF 1, or may be not the NF 1), an instance ID of the NF 2, an expected service name, an expiration time, and the first certificate information.

Based on the first aspect or the second aspect, in a possible embodiment, the token includes a claim (claim). In some embodiments of the present invention, the claim may include an instance ID of the NRF, the first certificate information, a type of the NF 2, an expected service name, and an expiration time.

In some other embodiments of the present invention, the claim may include an instance ID of the NRF, the first certificate information, an instance ID of the NF 2, an expected service name, and an expiration time.

It may be learned that, in this embodiment of the present invention, the token is designed to carry the certificate information, to implement binding between the certificate and the token. The instance ID of the NF 1 is replaced with the certificate information in the token, so that a quantity of parameters in the token can be maintained unchanged, thereby reducing data overheads and improving applicability to an existing architecture.

Based on the first aspect or the second aspect, in a possible embodiment, a mapping relationship between the instance ID of the NF 1 and third certificate information of the NF 1 is prestored in the NRF, to implement binding between the certificate and the token. In this way, the NF 2 can not only verify the token, but also invoke the NRF to verify whether the second certificate information and the instance ID of the requester of the token in the token meet the mapping relationship, to determine whether the identity of the NF 1 and/or the NF type of the NF 1 are/is valid.

Based on the first aspect or the second aspect, in a possible embodiment, a mapping relationship between the instance ID of the NF 1 and third certificate information of the NF 1 is prestored in the NRF, to implement binding between the certificate and the token. In this way, the SFSF first invokes the NRF to verify whether the fourth certificate information and the instance ID of the requester of the token in the token meet the mapping relationship, to determine whether the identity of the NF 1 and/or the NF type of the NF 1 are/is valid. If the identity of the NF 1 and/or the NF type of the NF 1 are/is valid, the NF 2 continues to verify the token; or otherwise, the NF 2 may reject the NF service request from the NF 1.

Based on the first aspect or the second aspect, in a possible embodiment, two (or more) types of identity verification may exist in identity verification. For example, the instance ID of the NF 1 and the certificate information may be both verified. For another example, the NF type of the NF 1 and the certificate information may be both verified.

Based on the first aspect or the second aspect, in a possible embodiment, in addition to the verification on the token, the identity verification may further include more types of verification, for example, verification on a digital signature (Sign).

According to a third aspect, an embodiment of the present invention provides an apparatus. The apparatus includes: a communications module, configured to receive a network function (NF) service request from a first network element, where the NF service request includes a token (token), and the token includes first certificate information; a verification module, configured to verify the first certificate information to determine whether an identity represented by the first certificate information is consistent with an identity of the first network element; and a processing module, configured to: when it is determined that the identity represented by the first certificate information is inconsistent with the identity of the first network element, reject, by the second network element, the NF service request.

The apparatus may be used to implement the method described in any embodiment of the first aspect.

According to a fourth aspect, an embodiment of the present invention provides another apparatus. The apparatus includes: a communications module, configured to obtain a token (token) corresponding to an NF service. The token includes first certificate information of a requester of the token. The communications module is further configured to send an NF service request to a second network element. The NF service request includes the token. The token is used to trigger the second network element to determine whether an identity represented by the first certificate information is consistent with an identity of the first network element. The communications module is further configured to: when an identity of the requester of the token is inconsistent with an identity of the second network element, receive a reject message from the second network element.

The apparatus may be used to implement the method described in any embodiment of the second aspect.

According to a fifth aspect, an embodiment of the present invention provides a hardware device. The device includes a processor, a memory, and a communications interface. The processor, the memory, and the communications interface may be connected or coupled together by using a bus. The memory is configured to store data and a program instruction. The communications interface is configured to implement communication with an external device. The processor is configured to invoke the program instruction to implement the method described in any embodiment of the first aspect.

According to a sixth aspect, an embodiment of the present invention provides another hardware device. The device includes a processor, a memory, and a communications interface. The processor, the memory, and the communications interface may be connected or coupled together by using a bus. The memory is configured to store data and a program instruction. The communications interface is configured to implement communication with an external device. The processor is configured to invoke the program instruction to implement the method described in any embodiment of the second aspect.

According to a seventh aspect, an embodiment of the present invention provides a nonvolatile computer readable storage medium. The computer readable storage medium is configured to store code that is used to implement the method described in the first aspect. When the program code is executed by a computing device, the computing device is configured to implement the method described in any embodiment of the first aspect.

According to an eighth aspect, an embodiment of the present invention provides another nonvolatile computer readable storage medium. The computer readable storage medium is configured to store code that is used to implement the method described in the second aspect. When the program code is executed by a computing device, the user equipment is configured to implement the method described in any embodiment of the second aspect.

According to a ninth aspect, an embodiment of the present invention provides a computer program product. The computer program product includes a program instruction. When the computer program product is executed by a computing device, the method described in any embodiment of the first aspect is executed.

According to a tenth aspect, an embodiment of the present invention provides a computer program product. The computer program product includes a program instruction. When the computer program product is executed by a computing device, the method described in any embodiment of the second aspect is executed.

It may be learned that, in the embodiments of the present invention, the token is designed to carry the certificate information, to implement binding between the certificate and the token. The second network element may verify the certificate information carried in the token to determine whether the identity of the requester of the token is consistent with the identity of the first network element, that is, determine whether the token is secure and valid, and further determine whether the identifier of the first network element and/or the NF type of the first network element are/is valid. Therefore, by implementing the embodiments of the present invention, in a process in which the network function service consumer requests a service from the network function service provider, identity validity of the network function service consumer can be verified, thereby improving service security. In addition, a potential security risk is prevented, for example, a risk that an attacker steals the token.

BRIEF DESCRIPTION OF DRAWINGS

To describe the technical solutions in the embodiments of the present invention or in the background more clearly, the following describes the accompanying drawings for describing the embodiments of the present invention or the background.

DESCRIPTION OF EMBODIMENTS

The following describes the embodiments of the present invention with reference to the accompanying drawings in the embodiments of the present invention. Terms used in an implementation part of the present invention are intended only to explain specific embodiments of the present invention, but are not intended to limit the present invention.

In a 5G communications system, a service-based architecture (SBA) is proposed. The SBA is designed based on a cloud native architecture. A concept "micro service" in an IT field is used for reference. The micro service indicates that a monolithic application program (Monolithic) is divided into a plurality of micro services with a smaller granularity. The micro services interact with each other by using an API. Each micro service is deployed, upgraded, and expanded independently of another service. An in-use application may be frequently updated without affecting use of a customer. Based on such a design idea, the SBA includes a network function service (NFS) and a service-based interface (for example, a serial peripheral interface (SBI)). After a software function of a network element is converted into a network function (NF), the NF is further divided into a plurality of modular NFSs. Each NFS has a feature of independence and autonomy. Functions of the NFS are displayed by using the service-based interface. Therefore, the NFS may be flexibly used by an authorized NF. For example, an AMF network element is used as an example. The AMF may include four NFSs, which are respectively Namf_Communication, Namf_EventExposure, Namf_MT, and Namf_Location.

A network slice in 5G is a logical network function instance set that supports a particular communications service requirement. The network slice finally realizes a dynamic connection between an NF instance of an access network (RAN) and an NF instance of a core network, and configures an end-to-end service chain, to implement flexible networking and implement a network customizable service. A carrier may determine the network slice based on a requirement of each specific communications service for a key performance indicator such as a capacity, coverage, a rate, a delay, or reliability. The network slice includes a set of NF instances and network resources required for running these NF instances, to provide a user with a required telecommunications service and network capability service, and meet a specific market scenario and requirement.

Figure 1:
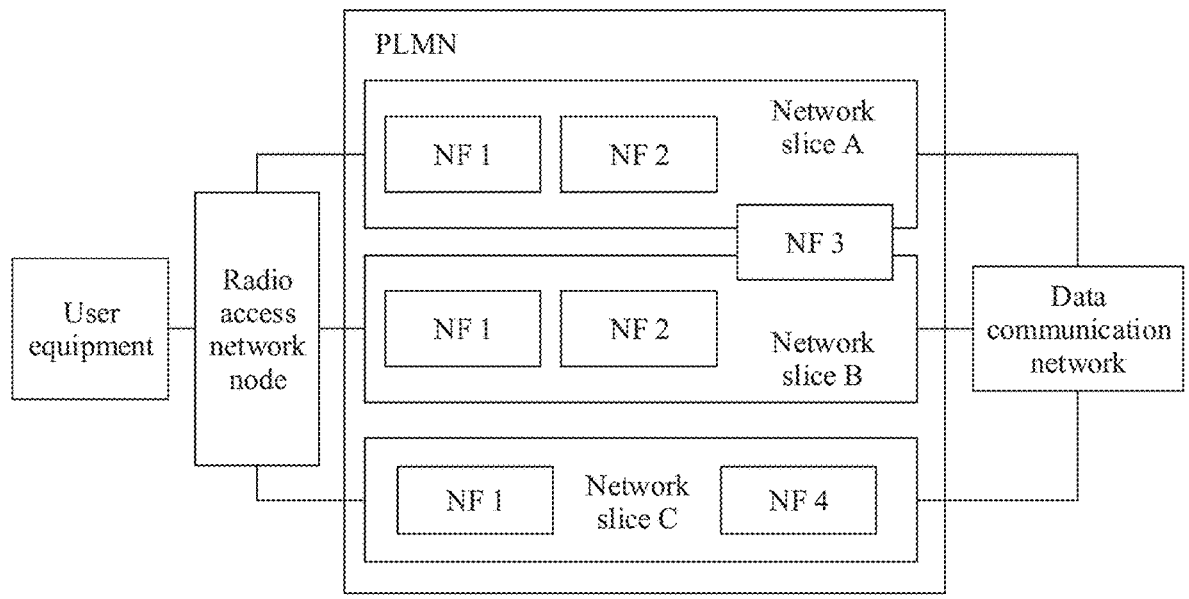
FIG. 1 is a schematic distribution diagram of network functions of network slices of a public land mobile network and different network slices.

FIG. 1 is a schematic distribution diagram of NFs in network slices of a public land mobile network (PLMN) and different network slices. As shown in FIG. 1, user equipment accesses the PLMN by using a radio access network node. The PLMN is divided into three network slices. Each network slice includes one group of NFs with specific functions. One NF includes one or more NFSs. NF is located in different network slices may be NFs in a same type (for example, a type of an NF 1 in a network slice A is the same as a type of an NF 1 in a network slice B in the diagram). NF 2s located in different network slices may be NFs in a same type (for example, a type of an NF 2 in the network slice A is the same as a type of an NF 2 in the network slice B in the diagram). NFs located in different network slices may be isolated from each other, even if these NFs are NFs in a same type. In addition, an NF that needs to be shared among a plurality of network slices (for example, an NF 3 in FIG. 1) may also exist.

In an NF included in each network slice, the NF (or the NFS) may be used as a network function service provider (NF service producer) to provide an application programming interface (API) for another NF to invoke; or the NF (or the NFS) may be used as a network function service consumer (NF service consumer) to invoke an API of another NF.

For example, the network function service consumer (for example, denoted as the NF 1) may be in an AUSF type, and the network function service provider (for example, denoted as the NF 2) may be in a UDM type. A service requested by the NF 1 from the NF 2 may be "Nudm_UEAuthentication_Get service operation". The service requires authorization of the NRF. Through the service, the NF 1 may obtain an authentication vector of the UE from the NF 2.

In this specification, the network function service consumer may also be briefly referred to as a requester of a service, and the network function service provider may also be briefly referred to as a service provider. In addition, the NF (or the NFS) that requests a token from the NRF may also be referred to as a requester of the token.

The technical solutions provided in the present invention may be applied to a mobile communications system such as a 5G communications system or an LTE system, or another authorization-based system; and are mainly applied to a scenario in which service interactive authorization is performed between different NFs in a service-based network architecture centered on an NF. The following mainly uses the 5G communications system as an example for solution description. It should be understood that the technical idea of the present invention may also be applied to another communications system.

Figure 2:
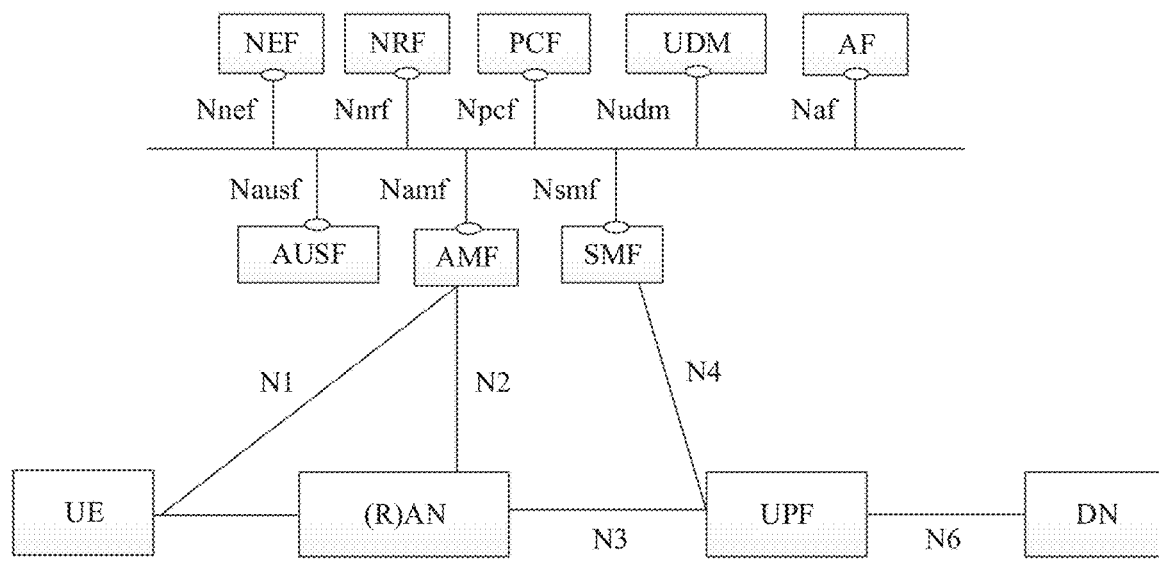
FIG. 2 is a diagram of a system architecture according to an embodiment of the present invention.

FIG. 2 is a schematic diagram of a network architecture according to this application. The network architecture includes user equipment, an access network device, and a carrier network (for example, a 5G network system). The carrier network further includes a core network and a data network. The user equipment accesses the carrier network by using an access network node. A specific description is as follows:

User equipment (UE): The UE is a logical entity. Specifically, the UE may be any one of terminal equipment, a communications device, and an Internet of things (IoT) device. The terminal equipment may be a smartphone, a smartwatch, a smart tablet, or the like. The communications device may be a server, a gateway (GW), a controller, or the like. The Internet of things device may be a sensor, an electricity meter, a water meter, or the like.

Radio access network (RAN): The RAN is responsible for access of the UE. The RAN may be a base station, a wireless fidelity (Wi-Fi) access point, a Bluetooth access point, or the like.

Data network (DN): The data network DN is also referred to as a PDN. The DN may be an external network of a carrier, or may be a network controlled by a carrier. The DN is used to provide a service for a user.

Core network (CN): The CN is used as a bearer network to provide an interface to the DN and provide communication connection, authentication, management, policy control, and data service bearer for the UE. The CN further includes an access and mobility management network element, a session management network element, an authentication server network element, a policy control node, an application function network element, a user plane node, and the like. A related description is specifically as follows:

An access and mobility management function (AMF) is a control plane network element provided by the carrier and is responsible for access control and mobility management of the UE when the UE accesses the carrier network.

A session management function (SMF) is a control plane network element provided by the carrier and is responsible for managing a session of a data packet of the UE.

Authentication server function (AUSF): The authentication server function network element AUSF is a control plane network element provided by the carrier and may be used for authentication performed by the carrier network for a network subscriber.

A unified data management network element (UDM) is a control plane network element provided by the carrier and is responsible for storing a subscriber permanent identifier (SUPI), registration information, a credential, subscription data, and the like of the carrier network.

Network exposure function (NEF): The NEF is a control plane network element provided by the carrier. The NEF is used to expose an external interface of the carrier network to a third party in a secure manner.

An application function (AF) is used to store a service security requirement and provide information for policy determining.

User plane node function (UPF): The UPF may be a gateway, a server, a controller, a user plane function network element, or the like. The UPF may be disposed inside the carrier network, or may be disposed outside the carrier network. The UPF is a user plane network element provided by the carrier, and is a gateway used for communication between the carrier network and the DN.

Network function repository function (NRF): The NRF is responsible for NF automation management, selection, and extensibility. The NRF specifically includes NFS registration, discovery, status monitoring, service authorization, and the like, to implement on-demand configuration of a network function and a network service and interconnection between NFs. When the NF is powered on, the NF actively reports NFS information of the NF to the NRF, and can find an appropriate peer NFS by using the NRF. Each network function service consumer (NF service consumer) needs to register with an NRF entity to obtain a token corresponding to a service. In a possible embodiment of the present invention, the NRF may be further used to verify a mapping relationship between certificate information of the NF and an instance ID of the NF, or may be used to verify a mapping relationship between certificate information of the NF and an NF type. In a specific implementation, the NRF may be, for example, a function entity such as a network element, a controller, or a server.

Herein, N1, N2, N3, N4, and N6 are interfaces between corresponding network elements.

The NF in this embodiment of the present invention may be a network function in the NEF, the PCF, the UDM, the AF, the AUSF, the AMF, the SMF, or the UPF. In a possible implementation, the NF may be alternatively a network function in the UE, the RAN, or the DN. In a specific implementation, the NF may be alternatively a function entity such as a terminal, a base station, a network element, a controller, or a server.

APIs of each NF include: a service-based interface exhibited by AMF (Service-based interface exhibited by AMF, Namf), a service-based interface exhibited by SMF (Service-based interface exhibited by SMF, Nsmf), a service-based interface exhibited by NEF (Service-based interface exhibited by NEF, Nnef), a service-based interface exhibited by NRF (Service-based interface exhibited by NRF, Nnrf), a service-based interface exhibited by PCF (Service-based interface exhibited by PCF, Npcf), a service-based interface exhibited by UDM (Service-based interface exhibited by UDM, Nudm), a service-based interface exhibited by AUSF (Service-based interface exhibited by AUSF, Nausf), a service-based interface exhibited by AF (Service-based interface exhibited by AF, Naf), and the like. This is not limited.

In the foregoing network architecture, communication and interaction (service interaction) may be directly performed between a network function service consumer (NF service consumer) and a network function service provider (NF service producer) by using a related interface.

Figure 3:
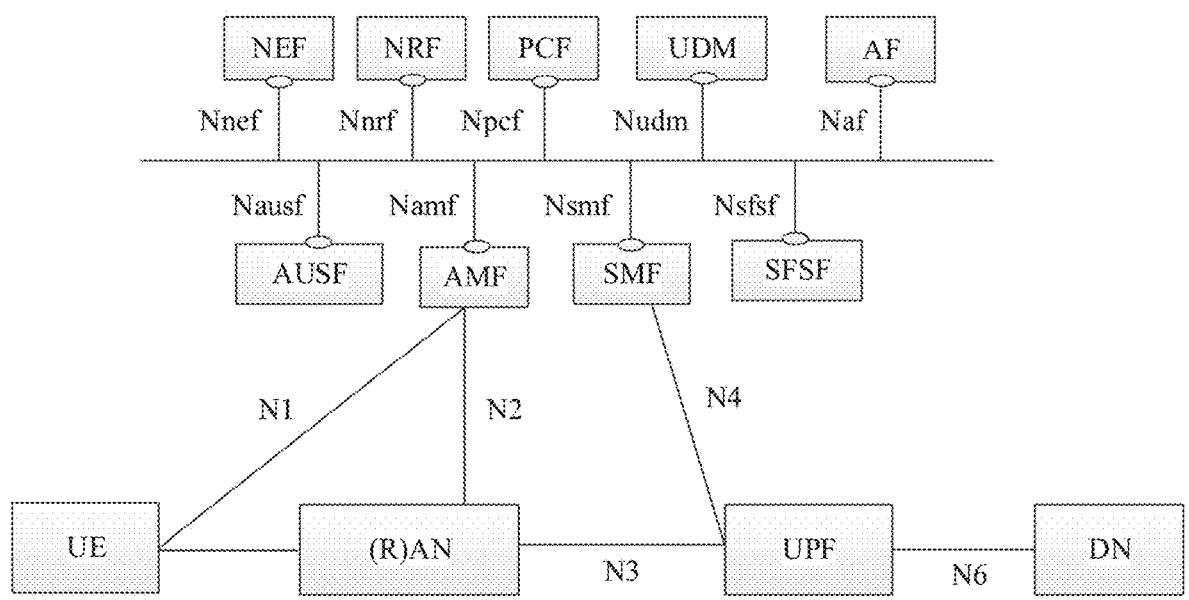
FIG. 3 is a diagram of another system architecture according to an embodiment of the present invention.

FIG. 3 is a schematic diagram of another network architecture according to this application. The network architecture includes user equipment, an access network device, and a carrier network. The carrier network further includes a core network and a data network. The user equipment accesses the carrier network by using an access network node. A difference between the network architecture shown in FIG. 3 and the network architecture shown in FIG. 2 is mainly that in addition to the network elements shown in FIG. 2, the network architecture shown in FIG. 3 further includes a service framework support function (SFSF).

The SFSF is mainly used to support at least one of functions such as registration, discovery, authorization, forwarding, and verification. Communication and interaction (service interaction) may be implemented between different NFs by using the SFSF. For example, the SFSF may support forwarding and verification. In some application scenarios, the SFSF may also be referred to as a SeCoP or a service communication proxy (SCP). In this embodiment of the present invention, the SFSF is mainly used to perform forwarding and proxy verification in the service communication. In a possible embodiment, the SFSF may be used to verify certificate information, or may be used to verify a mapping relationship between certificate information of an NF and an instance ID of the NF, or may be used to verify a mapping relationship between certificate information of an NF and an NF type. In a specific implementation, an SFSF entity may be, for example, an entity such as a network element, a controller, or a server.

In the foregoing network architecture, communication and interaction (service interaction) may be directly performed between a network function service consumer (NF service consumer) and a network function service provider (NF service producer) by using the SFSF.

Figure 4:
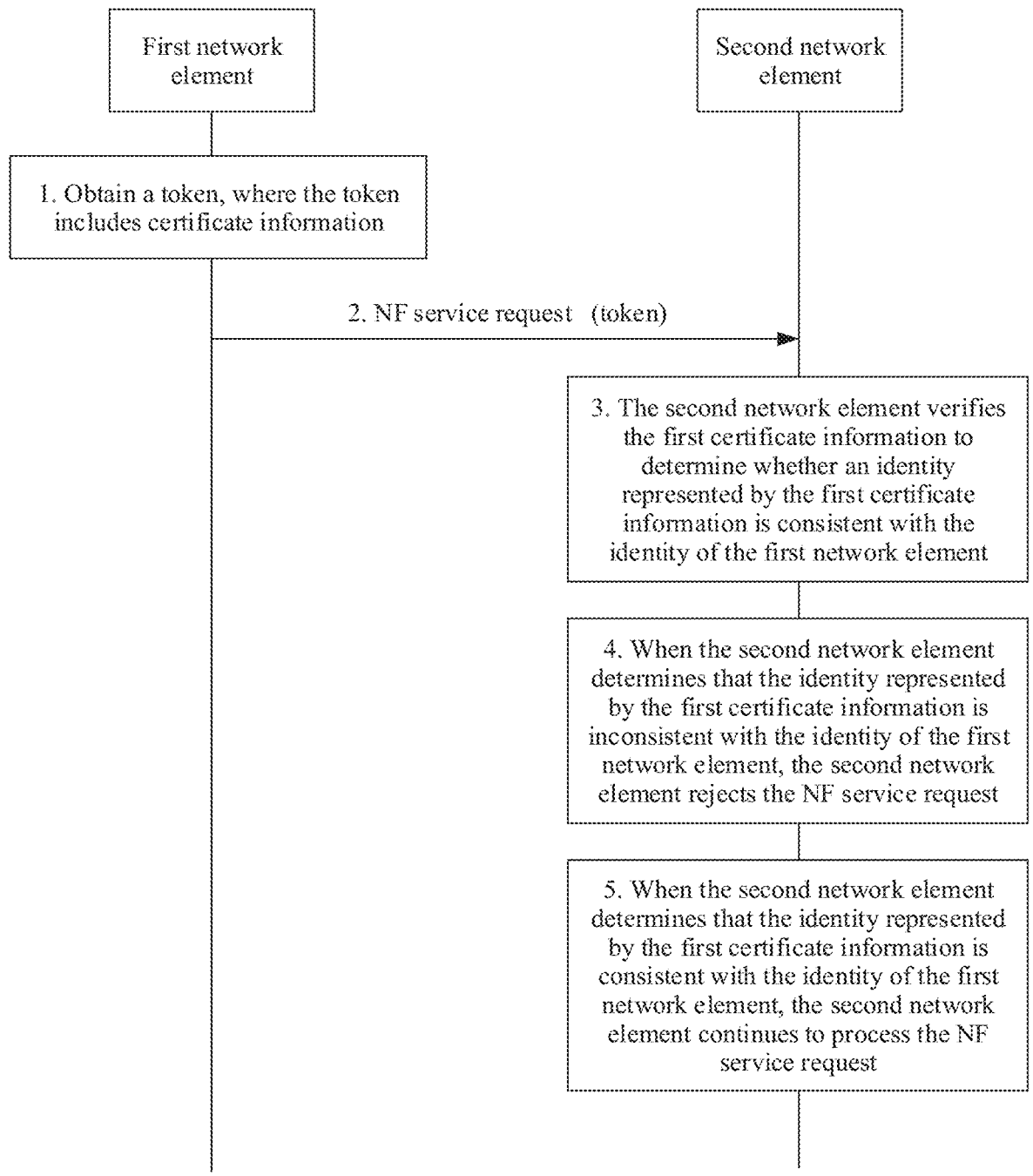
FIG. 4 shows an identity verification method for a network function service.

FIG. 4 is a schematic flowchart of an identity verification method for a network function service according to an embodiment of the present invention. The method includes but is not limited to the following steps.

S1. A first network element obtains a token corresponding to an NF service. The token includes first certificate information of a requester of the token.

Specifically, the first network element may send a token obtaining request to a second control plane network element. The second control plane network element generates the first certificate information based on a certificate of the first network element, and adds the first certificate information to the token. The second control plane network element sends a token obtaining response to the first network element. The token obtaining response includes the token.

In this embodiment of the present invention, the first network element may be a network element entity that has a specific function, for example, an NF (or an NFS). In a specific embodiment, the first network element may be a network function service consumer (NF service consumer), that is, a requester of a service (service). In another scenario, the first network element may be alternatively an entity such as a terminal, a base station, a network element of a core network, a controller, or a server. This is not limited herein. For ease of description, the following is mainly described by using an example in which the first network element is an NF (or an NFS).

In this embodiment of the present invention, the second control plane network element is a function entity used for registration and service authorization, and is responsible for controlling the first network element. In a specific embodiment, the second control plane network element may be an NRF. In another scenario, the second control plane network element may be alternatively an entity such as a terminal, a base station, a network element of a core network, a controller, or a server. This is not limited herein. For ease of description, the following is mainly described by using an example in which the first network element is an NRF.

S2. The first network element sends an NF service request to a second network element. The NF service request includes the token. The token includes the first certificate information of the requester of the token.

In this embodiment of the present invention, the second network element may be a network element entity that has a specific function, for example, an NF (or an NFS). In a specific embodiment, the second network element may be a network function service provider (NF service producer), that is, a provider of a service. In another scenario, the second network element may be alternatively an entity such as a terminal, a base station, a network element of a core network, a controller, or a server. This is not limited herein. For ease of description, when the second network element is a service provider, the following is mainly described by using an example in which the second network element is an NF (or an NFS). In this case, the first network element requests a corresponding service from the second network element by using the NF service request.

In this embodiment of the present invention, the second network element may also be a control plane network element (which may be referred to as a first control plane network element). The first control plane network element may be used to perform data forwarding, identity verification, and the like on the first network element. In a specific embodiment, the first control plane network element may be an SFSF. In another scenario, the first control plane network element may be alternatively an entity such as a terminal, a base station, a network element of a core network, a controller, or a server. This is not limited herein. For ease of description, the following is mainly described by using an example in which the first control plane network element is an SFSF. In this case, after the first network element sends the NF service request to the first control plane network element, the first control plane network element may be used to verify an identity of the first network element based on the token, and may be further used to transmit a message between the first network element and the service provider.

S3. The second network element verifies the first certificate information to determine whether an identity represented by the first certificate information is consistent with the identity of the first network element.

The identity represented by the first certificate information is the identity of the requester of the token (that is, a network element entity that requests authorization of the token from the NRF).

In this embodiment of the present invention, the first network element may be the requester of the token in the NF service request, or may not be the requester of the token. To ensure that the requester of the token and the first network element are a same network element and avoid a case in which the token is stolen, the second network element verifies the identity of the first network element based on the first certificate information to determine whether the identity of the requester of the token is consistent with the identity of the first network element.

When the second network element is a service provider, the second network element may generate second certificate information based on the certificate of the first network element, and verifies whether the first certificate information is the same as the second certificate information. For example, the first certificate information includes an identifier of the requester of the token, and the second certificate information includes an identifier of the first network element. Whether the identifier of the requester of the token is the same as the identifier of the first network element may be verified. For another example, the first certificate information includes an NF type of the requester of the token, and the second certificate information includes an NF type of the first network element. Whether the NF type of the requester of the token is the same as the NF type of the first network element may be verified.

When the second network element is the first control plane network element, the first control plane network element may generate fourth certificate information based on the certificate of the first network element, and verifies whether the first certificate information is the same as the fourth certificate information (for example, whether identifiers or types are the same).

When different certificate information has same content, or when NF identifiers or NF types of different certificate information are the same, it may be considered that the identity of the requester of the token is consistent with the identity of the first network element. In this case, the token is secure and valid.

When different certificate information has different content, or when NF identifiers or NF types of different certificate information are different, it may be considered that the identity of the requester of the token is inconsistent with the identity of the first network element. In this case, the token is insecure and invalid.

S4. When the second network element determines that the identity represented by the first certificate information is inconsistent with the identity of the first network element, the second network element rejects the NF service request. For example, the second network element sends a reject message to the first network element, or the second network element discards the NF service request.

S5. When the second network element determines that the identity represented by the first certificate information is consistent with the identity of the first network element, the second network element continues to process the NF service request.

When the second network element determines that the identity of the requester of the token is consistent with the identity of the second network element, the second network element continues to process the NF service request.

For example, when the second network element is the service provider, the second network element may continue to verify the token, execute a corresponding service after the verification succeeds, and return an NF service response to the first network element.

It may be learned that, in this embodiment of the present invention, the token is designed to carry the certificate information, to implement binding between the certificate and the token. The second network element may verify the certificate information carried in the token to determine whether the identity of the requester of the token is consistent with the identity of the first network element, that is, determine whether the token is secure and valid, and further determine whether the identifier of the NF 1 and/or the NF type of the NF 1 are/is valid. Therefore, by implementing this embodiment of the present invention, in a process in which the network function service consumer requests a service from the network function service provider, identity validity of the network function service consumer can be verified, thereby improving service security. In addition, a potential security risk is prevented, for example, a risk that an attacker steals the token.

Based on the foregoing system architecture and related description, the embodiments of the present invention further provide some identity verification methods for a network function service.

For ease of differentiation in this specification, the certificate information that is carried in the token and that is sent by the NF 1 to the NF 2 may be referred to as the first certificate information, the certificate information generated by the NF 2 based on the certificate of the NF 1 may be referred to as the second certificate information, certificate information generated by the NRF based on the certificate of the NF 1 may be referred to as third certificate information, and the certificate information generated by the SFSF based on the certificate of the NF 1 may be referred to as the fourth certificate information. The second certificate information may be consistent with the third certificate information. However, the first certificate information may be consistent or inconsistent with the second certificate information. The first certificate information may be consistent or inconsistent with the third certificate information. Likewise, the fourth certificate information may be consistent with the third certificate information. However, the first certificate information may be consistent or inconsistent with the fourth certificate information.

In addition, in this specification, an identifier of the NF 1 in the certificate may be referred to as a second identifier of the NF 1, and an instance ID of the NF 1 in the token is referred to as a first identifier of the NF 1. The first identifier is different from the second identifier.

Figure 5:
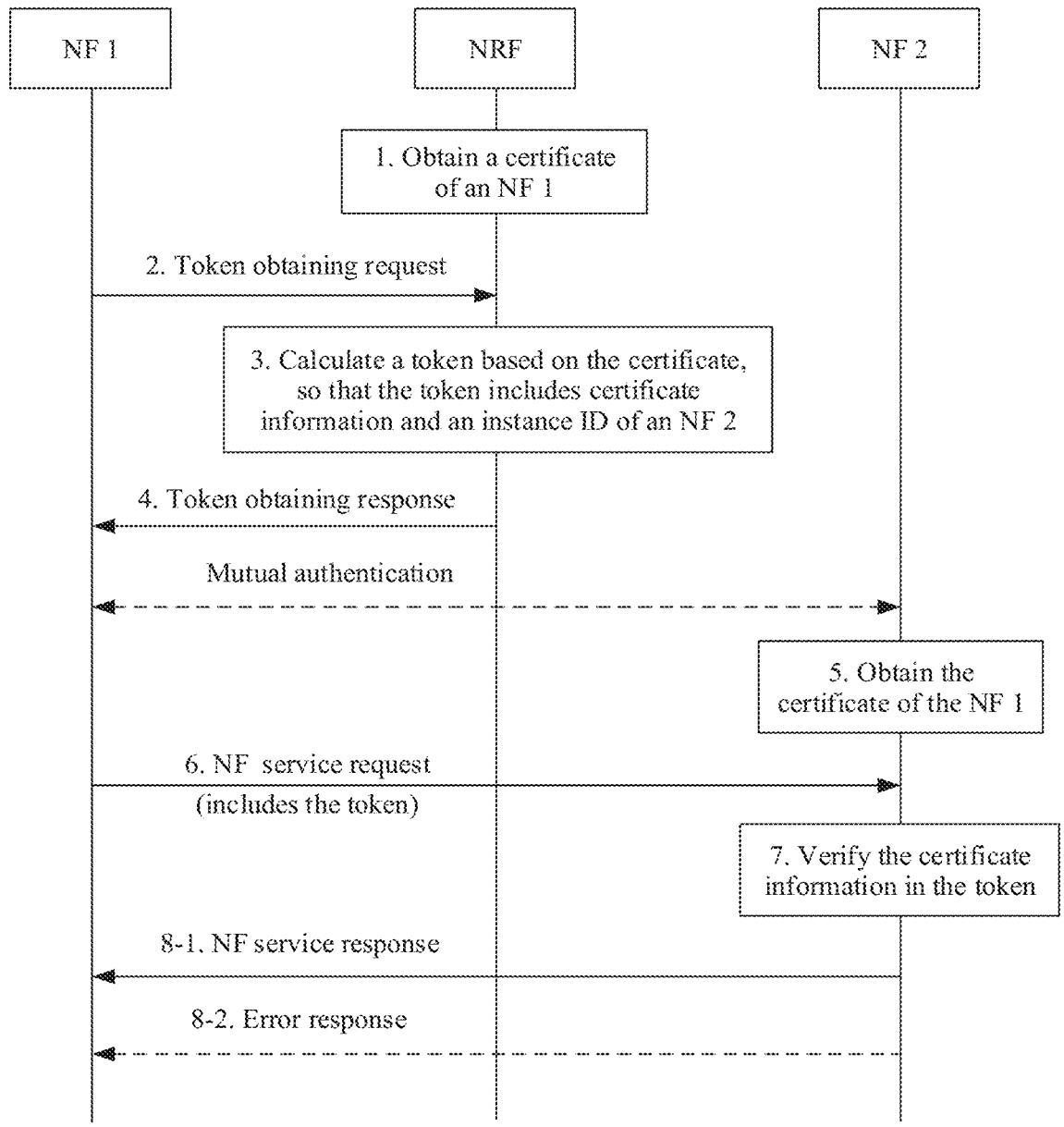
FIG. 5 is a schematic flowchart of an identity verification method for a network function service according to an embodiment of the present invention.

FIG. 5 is a schematic flowchart of an identity verification method for a network function service according to an embodiment of the present invention. In the method, an NF (or an NFS) used as a network function service consumer (NF service consumer) is referred to as an NF 1, and an NF (or an NFS) used as a network function service provider (NF service producer) is referred to as an NF 2. The method includes a process in which the NF 1 applies to an NRF and obtains a token corresponding to a service, and a process in which the NF 1 communicates with and interacts with the NF 2.

The process in which the NF 1 applies to the NRF and obtains the token corresponding to the service may include but is not limited to S1 to S4. A description is as follows: S1. The NRF obtains and stores a certificate of the NF 1.

In this embodiment of the present invention, a certificate is used to prove an identity of an NF. The certificate may be issued by a certificate center. Specifically, the certificate of the NF 1 may include an identifier of the NF 1, and may further include an NF type of the NF 1. The identifier (that is, a second identifier) of the NF 1 in the certificate may be a unique identifier of the NF 1, for example, may be a NAI address, an FQDN address, an IP address, or a device identifier of the NF 1.

Specifically, in some possible embodiments, when the NF 1 registers with the NRF, registration information may carry the certificate of the NF 1. In this way, after receiving the registration information, the NRF may obtain the certificate of the NF 1 and store the certificate of the NF 1 locally in the NRF.

In some other possible embodiments, when mutual authentication (mutual authentication) is performed between the NF 1 and the NRF, the NF 1 may send the certificate of the NF 1 to the NRF. Correspondingly, the NRF receives the certificate of the NF 1 and stores the certificate of the NF 1 locally in the NRF.

In some other possible embodiments, after mutual authentication is performed between the NF 1 and the NRF, the NF 1 may alternatively send the certificate of the NF 1 to the NRF.

In some other possible embodiments, the certificate of the NF 1 may be alternatively preconfigured in the NRF.

In addition, the NRF may alternatively obtain the certificate of the NF 1 in another manner. This is not limited in the present invention.

S2. The NF 1 sends a token obtaining request to the NRF.

In some possible embodiments, the token obtaining request may include an instance ID of the NF 1 (NF Instance Id(s) of the NF service consumer), an expected service name (expected NF service name(s)), an expected NF type of the NF 2, an expiration time (expiration time), and an NF type of the NF 1 (NF type of the NF Service producer). In this specification, the NF type is used to indicate a type of network element with a function. For example, the NF type of the NF 1 may be an AMF type, an SMF type, a UDM type, or the like. This is not limited in this specification.

In some possible embodiments, the token obtaining request may include an instance ID of the NF 1, an expected service name, and an instance ID of the NF 2.

Optionally, the token obtaining request may further include related information of the certificate of the NF 1, for example, at least one of the following: the certificate of the NF 1, the identifier of the NF 1 in the certificate of the NF 1, or a type of the NF 1 in the certificate of the NF 1. Correspondingly, the NRF obtains the related information of the certificate of the NF 1.

S3. The NRF calculates the token based on the certificate that is of the NF 1 and that is obtained in S1. Optionally, the NRF may alternatively calculate the token based on the related information that is of the certificate of the NF 1 and that is obtained in S2. The token is used to indicate that the NRF authorizes the NF 1 with permission to view or operate the corresponding service.

Specifically, the NRF may calculate the token based on a local policy. In addition, the NRF may further encrypt the token, and/or may protect the token through integrity protection in a manner based on a digital signature or a message verification code. The calculation of the token is not limited herein.

The token includes a claim. In some embodiments of the present invention, the claim may include an instance ID of the NRF (NF Instance Id of NRF), an instance ID of the NF 1, a type of the NF 2, an expected service name, an expiration time, and third certificate information.

In some other embodiments of the present invention, the claim may include an instance ID of the NRF, an instance ID of the NF 1, an instance ID of the NF 2, an expected service name, an expiration time, and third certificate information.

In some embodiments, the third certificate information may be the certificate of the NF 1. In some other embodiments, the third certificate information may be alternatively information obtained by performing an operation on the certificate of the NF 1, for example, common mapping processing or processing in a hash function manner. The mapping processing is performing a function mapping operation on the certificate of the NF 1 by using a specified rule. The hash processing is algorithm processing by using a hash algorithm or an algorithm in a hash algorithm type to output a constant-length parameter. In this case, the parameter may be understood as a parameter digest before the processing.

In some other embodiments, the third certificate information may be alternatively the identifier (that is, the second identifier) of the NF 1 in the certificate of the NF 1. In some other embodiments, the third certificate information may be alternatively information obtained after hash processing performed on the identifier of the NF 1 in the certificate.

In some other embodiments, the third certificate information may be alternatively the NF type of the NF 1 in the certificate. In some other embodiments, the third certificate information may be alternatively information obtained after hash processing performed on the NF type of the NF 1 in the certificate.

S4. The NRF sends a token obtaining response to the NF 1. The token obtaining response carries the token.

In an optional embodiment, the NF 1 receives the token, and may further verify based on the certificate locally stored in the NF 1 whether the third certificate information in the token is correct.

In an optional embodiment, if the token is in a ciphertext form, in this case, the NF 1 may fail to read the third certificate information in the token. Therefore, the NRF may further send the third certificate information in the token to the NF 1 when the NRF sends the token obtaining response to the NF 1. After receiving the third certificate information, the NF 1 verifies based on the certificate locally stored in the NF 1 whether the third certificate information in the token is correct.

If a verification result is correct, the NF 1 may use the token to execute a subsequent method procedure.

If a verification result is incorrect, the NF 1 may further send an error indication or an error message of the third certificate information to the NRF. The error message indicates that the verification on the third certificate information fails.

The process in which the NF 1 communicates with and interacts with the NF 2 may include but is not limited to S5 to S8 (S8 includes S8-1 and S8-2). Descriptions are as follows:

S5. The NF 2 obtains the certificate of the NF 1.

In some possible embodiments, when mutual authentication (mutual authentication) is performed between the NF 1 and the NF 2, the NF 1 may send the certificate of the NF 1 to the NF 2. Correspondingly, the NF 2 receives the certificate of the NF 1 and stores the certificate of the NF 1 locally in the NF 2.

In some other possible embodiments, after mutual authentication is performed between the NF 1 and the NF2, the NF 1 may alternatively send the certificate of the NF 1 to the NF 2.

In some other possible embodiments, the certificate of the NF 1 may be alternatively preconfigured in the NF 2.

In addition, the NF 2 may alternatively obtain the certificate of the NF 1 in another manner. This is not limited in the present invention.

It should be further noted that a sequence between S5 and any step in S1 to S4 is not limited in the present invention.

S6. The NF 1 sends an NF service request (or referred to as a service request) to the NF 2. The NF service request includes the token. Correspondingly, the NF 2 receives the NF service request.

The token includes a claim (claim). In some embodiments of the present invention, the claim may include an instance ID of the NRF, an instance ID of the requester of the token (the requester of the token herein may be the NF 1, or may be not the NF 1), a type of the NF 2, an expected service name, an expiration time, and the first certificate information.

In some other embodiments of the present invention, the claim may include an instance ID of the NRF, an instance ID of the requester of the token (the requester of the token herein may be the NF 1, or may be not the NF 1), an instance ID of the NF 2, an expected service name, an expiration time, and the first certificate information.

S7. The NF 2 verifies the first certificate information in the token.

In some embodiments, the NF 2 may further obtain the first certificate information in the token, and then verify the first certificate information. When the verification succeeds, the NF 2 continues to verify other content in the token.

In some other embodiments, the NF 2 may alternatively first verify other content in the token. When the verification succeeds, the NF 2 continues to verify the token.

A method in which the NF 2 verifies the first certificate information in the token may be: The NF 2 may use a manner the same as that used by the NRF to obtain the second certificate information through calculation based on the certificate that is of the NF 1 and that is locally stored in the NF 2. Then, the NF 2 verifies whether the second certificate information is the same as the first certificate information in the token. For example, the NF 2 verifies whether the second identifier that is of the NF 1 and that is included in the second certificate information is the same as that included in the first certificate information, or verifies whether the type that is of the NF 1 and that is included in the second certificate information is the same as that included in the first certificate information. If the second certificate information is the same as the first certificate information in the token, the verification on the first certificate information succeeds. It indicates that the requester of the token and the requester of the service are a same NF (that is, the NF 1). Otherwise, the verification on the first certificate information fails. It indicates that the requester of the token and the requester of the service may be not a same NF (that is, the token may be stolen).

A method in which the NF 2 verifies the other content in the token may be one or more of the following: verifying correctness of a digital signature or a message verification code; verifying whether a type of the NF 2 is the same as the type of the NF 2 in the token; verifying whether an instance ID of the NF 2 is consistent with the instance ID of the NF 2 in the token; verifying whether a name of the service requested by NF 1 falls within a range of the expected service name in the token; verifying the expiration time in the token based on a current time to determine whether the token expires; and the like. This is not limited.

When the verification on the token and the verification on the other content in the token in the foregoing both succeed, S8-1 is subsequently performed.

When at least one of the verification on the token and the verification on the other content in the token in the foregoing fails, S8-2 is subsequently performed.

S8-1. The NF 2 executes the service requested by the NF 1, and sends an NF service response to the NF 1.

S8-2. Optionally, the NF 2 may send an error response to the NF 1. Further, the error response may include an error indication. The error indication may be, for example, used to indicate that the verification on the second identifier of the NF 1 or the verification on the type of the NF 1 fails.

Optionally, the NF 2 may send a reject message to the NF 1. The reject message is used to indicate that the NF 2 rejects the NF service request of the NF 1.

Optionally, the NF 2 may directly discard the NF service request.

In the prior art, the ID of the NF 1 in the certificate is different from the instance ID of the NF 1 in the token. In this case, the NF 2 cannot verify an identity of the NF 1 when verifying the token sent by the NF 1. Therefore, neither the NRF nor the NF 2 can determine whether an NF applying for a token and an NF requesting a service from the NF 2 are a same NF.

In this embodiment of the present invention, the token is designed to carry the certificate information, to implement binding between the certificate and the token. In this way, the NF 2 can not only verify the token, but also verify, based on the locally stored certificate of the NF 1, the certificate information carried in the token. In this way, the NF 2 determines whether the identity of the NF 1 and/or the NF type of the NF 1 are/is valid. Therefore, by implementing this embodiment of the present invention, in a process in which the NF 1 obtains the service from the NF 2, identity validity of the NF 1 can be verified, thereby improving service security. In addition, a potential security risk is prevented, for example, a risk that an attacker steals the token.

Further, focuses of all the embodiments of the present invention are how to add certificate information in a generated token, how to generate a token, and how to verify certificate information. Writing and verification of other parameters in the token are not limited. The present invention provides only a manner of other possible parameters for a full description of the embodiments.

Figure 6:
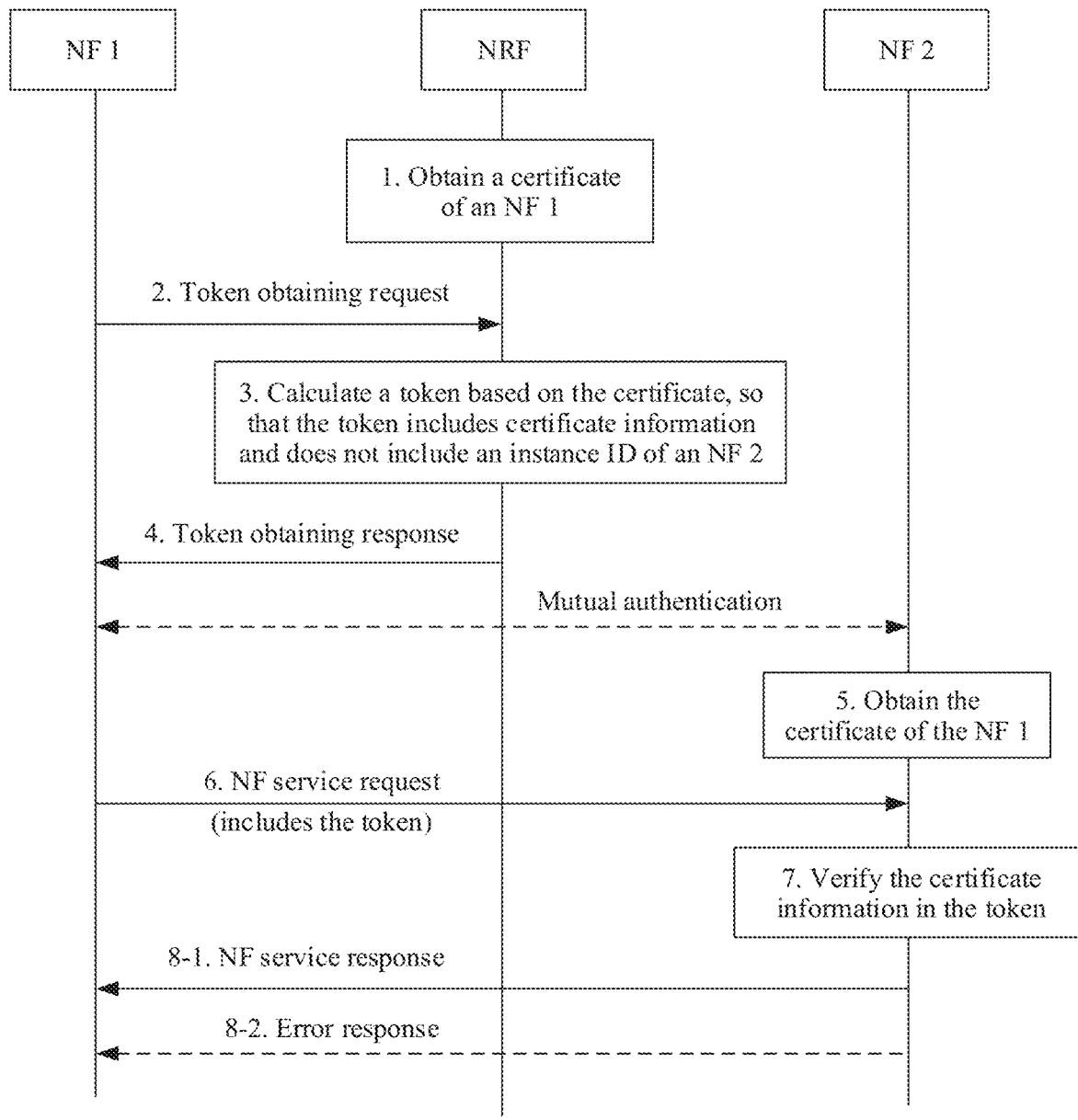
FIG. 6 is a schematic flowchart of another identity verification method for a network function service according to an embodiment of the present invention.

FIG. 6 is a schematic flowchart of another identity verification method for a network function service according to an embodiment of the present invention. In the method, an NF (or an NFS) used as a network function service consumer (NF service consumer) is referred to as an NF 1, and an NF (or an NFS) used as a network function service provider (NF service producer) is referred to as an NF 2. The method includes a process in which the NF 1 requests from an NRF and obtains a token corresponding to a service, and a process in which the NF 1 communicates with and interacts with the NF 2. A main difference between the method shown in the embodiment of FIG. 6 and the method shown in the embodiment of FIG. 5 is that the token includes both the instance ID of the NF 1 and the first certificate information in the embodiment of FIG. 5, but the instance ID of the NF 1 in the token is directly replaced with the first certificate information in the embodiment of FIG. 6. A brief description is as follows:

The process in which the NF 1 applies to the NRF and obtains the token corresponding to the service may include but is not limited to S1 to S4. A description is as follows:

S1. The NRF obtains and stores a certificate of the NF 1. For related content, refer to the description of S1 in the embodiment of FIG. 5. Details are not described herein again.

S2. The NF 1 sends a token obtaining request to the NRF. For related content, refer to the description of S2 in the embodiment of FIG. 5. Details are not described herein again.

S3. The NRF calculates the token based on the certificate that is of the NF 1 and that is obtained in S1.

Specifically, the NRF may calculate the token based on a local policy. In addition, the NRF may further encrypt the token, and/or may protect the token through integrity protection in a manner based on a digital signature or a message verification code.

The token includes a claim (claim). In some embodiments of the present invention, the claim may include an instance ID of the NRF (NF Instance Id of NRF), third certificate information, a type of the NF 2, an expected service name, and an expiration time.

In some other embodiments of the present invention, the claim may include an instance ID of the NRF, third certificate information, an instance ID of the NF 2, an expected service name, and an expiration time.

Likewise, in some embodiments, the third certificate information may be the certificate of the NF 1. In some other embodiments, the third certificate information may be alternatively information obtained after hash (hash) processing performed on the certificate of the NF 1. In some other embodiments, the third certificate information may be alternatively an identifier (that is, a second identifier) of the NF 1 in the certificate of the NF 1. In some other embodiments, the third certificate information is alternatively information obtained after hash processing performed on the identifier of the NF 1 in the certificate. In some other embodiments, the third certificate information may be alternatively an NF type of the NF 1 in the certificate. In some other embodiments, the third certificate information may be alternatively information obtained after hash processing performed on the NF type of the NF 1 in the certificate.

S4. The NRF sends a token obtaining response to the NF 1. The token obtaining response carries the token. For related content, refer to the description of S4 in the embodiment of FIG. 5. Details are not described herein again.

The process in which the NF 1 communicates with and interacts with the NF 2 may include but is not limited to S5 to S8. For detailed content, refer to the descriptions of S5 to S8 in the embodiment of FIG. 5.

S5. The NF 2 obtains the certificate of the NF 1.

S6. The NF 1 sends an NF service request to the NF 2. The NF service request includes the token. Correspondingly, the NF 2 receives the NF service request.

The token includes a claim (claim). In some embodiments of the present invention, the claim may include an instance ID of the NRF, first certificate information, a type of the NF 2, an expected service name, and an expiration time.

In some other embodiments of the present invention, the claim may include an instance ID of the NRF, first certificate information, an instance ID of the NF 2, an expected service name, and an expiration time.

S7. The NF 2 verifies the first certificate information in the token.

S8-1. The NF 2 executes the service requested by the NF 1, and sends an NF service response to the NF 1.

S8-2. Optionally, the NF 2 sends an error response to the NF 1 to notify the NF 1 that the verification on the certificate information in the token fails.

Optionally, the NF 2 may send a reject message to the NF 1. The reject message is used to indicate that the NF 2 rejects the NF service request of the NF 1.

Optionally, the NF 2 may directly discard the NF service request.

It may be learned that in this embodiment of the present invention, the token is designed to carry the certificate information, to implement binding between the certificate and the token. In this way, the NF 2 can not only verify the token, but also verify, based on the locally stored certificate of the NF 1, the certificate information carried in the token. In this way, the NF 2 determines whether an identity of the NF 1 and/or the NF type of the NF 1 are/is valid. In addition, the instance ID of the NF 1 is replaced with the certificate information in the token, so that a quantity of parameters in the token can be maintained unchanged, thereby reducing data overheads and improving applicability to an existing architecture. Therefore, by implementing this embodiment of the present invention, in a process in which the NF 1 obtains the service from the NF 2, identity validity of the NF 1 can be verified, thereby improving service security.

Figure 7:
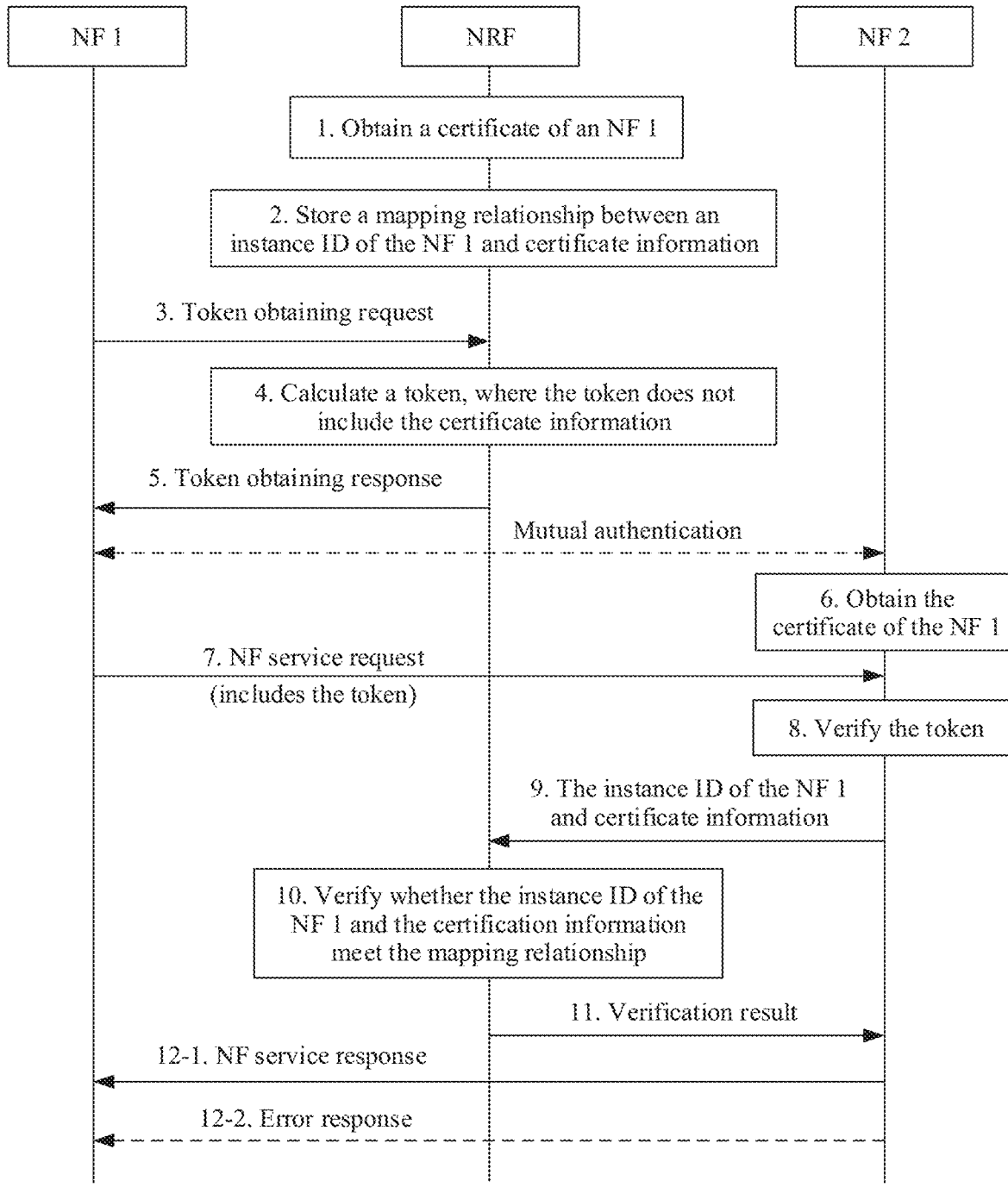
FIG. 7 is a schematic flowchart of another identity verification method for a network function service according to an embodiment of the present invention.

FIG. 7 is a schematic flowchart of another identity verification method for a network function service according to an embodiment of the present invention. In the method, an NF (or an NFS) used as a network function service consumer (NF service consumer) is referred to as an NF 1, and an NF (or an NFS) used as a network function service provider (NF service producer) is referred to as an NF 2. The method includes a process in which the NF 1 applies to an NRF and obtains a token corresponding to a service, and a process in which the NF 1 communicates with and interacts with the NF 2. A main difference between the method shown in the embodiment of FIG. 7 and the method shown in the embodiment of FIG. 5 is that the NF 2 locally generates the second certificate information to verify the first certificate information in the token in the embodiment of FIG. 5, but the NRF stores a mapping relationship between third certificate information of the NF 1 and an instance ID of the NF 1 in the embodiment of FIG. 7. The NF 2 needs to request the NRF to verify whether the second certificate information generated by the NF 2 and an instance ID of a requester of the token in the token (the requester of the token herein may be the NF 1, or may be not the NF 1) meet the mapping relationship. A specific description is as follows:

The process in which the NF 1 applies to the NRF and obtains the token corresponding to the service may include but is not limited to S1 to S5. A description is as follows:

S1. The NRF obtains and stores a certificate of the NF 1.

In a specific embodiment, when the NF 1 registers with the NRF, the NF 1 sends registration information to the NRF. The registration information carries the certificate of the NF 1. Alternatively, when mutual authentication is performed between the NF 1 and the NRF, the NRF obtains the certificate of the NF 1. Alternatively, after mutual authentication is performed between the NF 1 and the NRF, the NF 1 sends the certificate of the NF 1 to the NRF. Alternatively, the certificate of the NF 1 is preconfigured in the NRF. A manner in which the NRF obtains the certificate of the NF 1 is not limited.

S2. The NRF locally stores a mapping relationship between an instance ID of the NF 1 and third certificate information.

Specifically, when the NF 1 registers with the NRF, the NF 1 adds the instance ID of the NF 1 to the registration information and sends the registration information to the NRF, so that the NRF obtains the instance ID of the NF 1. The NRF obtains the third certificate information based on the certificate of the NF 1, and locally stores the mapping relationship between the instance ID of the NF 1 and the third certificate information. Alternatively, for example, the instance ID of the NF 1 is locally configured in the NRF. An obtaining manner is not limited.

In some embodiments, the third certificate information may be the certificate of the NF 1. In some other embodiments, the third certificate information may be alternatively information obtained after hash (hash) processing performed on the certificate of the NF 1.

In some other embodiments, the third certificate information may be alternatively an identifier (that is, a second identifier) of the NF 1 in the certificate of the NF 1. In some other embodiments, the third certificate information may be alternatively information obtained after hash processing performed on the identifier of the NF 1 in the certificate.

In some other embodiments, the third certificate information may be alternatively an NF type of the NF 1 in the certificate. In some other embodiments, the third certificate information may be alternatively information obtained after hash processing performed on the NF type of the NF 1 in the certificate.

S3. The NF 1 sends a token obtaining request to the NRF. Optionally, the token obtaining request may further include related information of the certificate of the NF 1. For specific content, refer to the description of S2 in the embodiment of FIG. 5. Details are not described herein again.

S4. The NRF calculates the token in an existing manner. It should be noted that the token herein may not include the third certificate information.

Specifically, the NRF may calculate the token based on a local policy. In addition, the NRF may further encrypt the token, and/or may protect the token through integrity protection in a manner based on a digital signature or a message verification code.

The token includes a claim (claim). In some embodiments of the present invention, the claim may include an instance ID of the NRF, an instance ID of the NF 1, a type of the NF 2, an expected service name, and an expiration time.

In some other embodiments of the present invention, the claim may include an instance ID of the NRF, an instance ID of the NF 1, an instance ID of the NF 2, an expected service name, and an expiration time.

Optionally, if the NRF does not store the mapping relationship between the instance ID of the NF 1 and the third certificate information in S2, in this case, the NRF may also establish the mapping relationship between the instance ID of the NF 1 and the third certificate information based on the related information that is of the certificate of the NF 1 and that is sent by the NF 1 in S3.

S5. The NRF sends a token obtaining response to the NF 1. The token obtaining response carries the token. For specific content, refer to the description of S4 in the embodiment of FIG. 5. Details are not described herein again.

The process in which the NF 1 communicates with and interacts with the NF 2 may include but is not limited to S6 to S12 (S12 includes S12-1 and S12-2). A description is as follows:

S6. The NF 2 obtains the certificate of the NF 1. For specific content, refer to the description of S5 in the embodiment of FIG. 5. Details are not described herein again.

S7. The NF 1 sends an NF service request to the NF 2. The NF service request includes the token. Correspondingly, the NF 2 receives the NF service request.

The token includes a claim (claim). In some embodiments of the present invention, the claim may include an instance ID of the NRF, an instance ID of the requester of the token (the requester of the token herein may be the NF 1, or may be not the NF 1), a type of the NF 2, an expected service name, an expiration time, and the first certificate information.

In some other embodiments of the present invention, the claim may include an instance ID of the NRF, an instance ID of the requester of the token (the requester of the token herein may be the NF 1, or may be not the NF 1), an instance ID of the NF 2, an expected service name, an expiration time, and first certificate information.

S8. The NF 2 verifies the token according to an existing technology.

For example, a method in which the NF 2 verifies the token may be one or more of the following: verifying correctness of a digital signature or a message verification code; verifying whether a type of the NF 2 is the same as the type of the NF 2 in the token; verifying whether an instance ID of the NF 2 is consistent with the instance ID of the NF 2 in the token; verifying whether a name of the service requested by the NF 1 falls within a range of the expected service name in the token; verifying the expiration time in the token based on a current time to determine whether the token expires; and the like.

S9. The NF 2 calculates second certificate information based on the certificate of the NF 1, and sends the instance ID of the requester of the token in the token and the second certificate information to the NRF. For a manner of calculating the second certificate information, refer to a manner of calculating the first certificate information/the third certificate information. Details are not described herein.

S10. The NRF determines, based on the stored mapping relationship between the instance ID of the NF 1 and the third certificate information of the NF 1, whether the instance ID of the requester of the token and the second certificate information that are received from the NF 2 meet the mapping relationship. If the mapping relationship is met, it indicates that the verification succeeds. If the mapping relationship is not met, it indicates that the verification fails.

S11. If the verification in S10 succeeds, the NRF sends a verification result to the NF 2. The verification result is used to indicate that the verification succeeds.

It should be noted that, if the verification in S10 fails, the NRF sends a verification result to the NF 2. The verification result is used to indicate that the verification fails. The verification result may further directly indicate that the verification on the instance ID of the requester of the token fails.

S12-1. When the verification in S8 succeeds and the verification result of S10 indicates that the verification succeeds, the NF 2 executes the service requested by the NF 1, and sends an NF service response to the NF 1.

S12-2. Optionally, if at least one of the verification in S8 and the verification in S10 fails, the NF 2 sends an error response to the NF 1. Further, the error response may include an error indication. The error indication may be, for example, used to indicate that the verification on the instance ID of the requester of the token fails.

Optionally, if at least one of the verification in S8 and the verification in S10 fails, the NF 2 may send a reject message to the NF 1. The reject message is used to indicate that the NF 2 rejects the NF service request of the NF 1.

Optionally, if at least one of the verification in S8 and the verification in S10 fails, the NF 2 may alternatively directly discard the NF service request.

It should be noted that in another implementation solution, the certificate information may be first verified, and then the token can be verified. In other words, S8 is executed after S11.

It should be noted that, if the second certificate information sent by the NF 2 is different from the third certificate information stored in the NRF, when the NRF obtains the second certificate information sent by the NF 2, and the NRF stores hash of the certificate of the NF 1, the NRF may securely process the second certificate information (for example, process the second certificate information by using the hash), so that the second certificate information is the same as the third certificate information.

It should be noted that, in some modified solutions, it may be designed to prestore the mapping relationship between the NF type of the NF 1 and the third certificate information of the NF 1 in the NRF, and it may be designed to add the NF type of the requester of the token to the token. In this way, whether the NF type of the requester of the token and the second certificate information that are received from the NF 2 meet the mapping relationship can be determined. If the mapping relationship is met, it indicates that the verification succeeds. If the mapping relationship is not met, it indicates that the verification fails. For specific content, refer to the foregoing procedure in the embodiment of FIG. 7. Details are not described herein again.

It may be learned that, in this embodiment of the present invention, the mapping relationship between the instance ID of the NF 1 and the third certificate information of the NF 1 is prestored in the NRF, to implement binding between the certificate and the token. In this way, the NF 2 can not only verify the token, but also invoke the NRF to verify whether the second certificate information and the instance ID of the requester of the token in the token meet the mapping relationship, to determine whether an identity of the NF 1 and/or the NF type of the NF 1 are/is valid. Therefore, by implementing this embodiment of the present invention, in a process in which the NF 1 obtains the service from the NF 2, identity validity of the NF 1 can be verified, thereby improving service security. In addition, a potential security risk is prevented, for example, a risk that an attacker steals the token.

Figure 8:
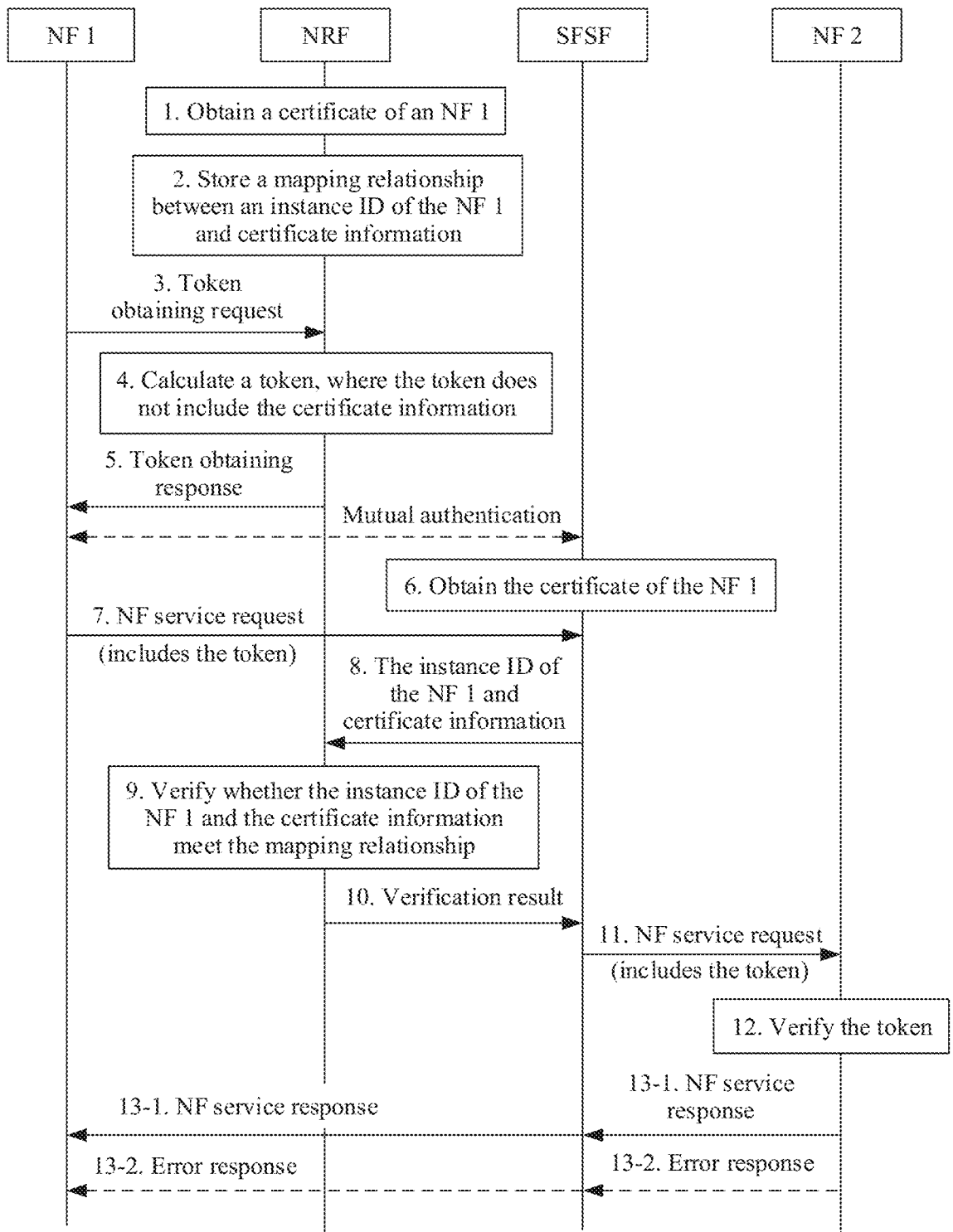
FIG. 8 is a schematic flowchart of another identity verification method for a network function service according to an embodiment of the present invention.

FIG. 8 is a schematic flowchart of another identity verification method for a network function service according to an embodiment of the present invention. In the method, an NF (or an NFS) used as a network function service consumer (NF service consumer) is referred to as an NF 1, and an NF (or an NFS) used as a network function service provider (NF service producer) is referred to as an NF 2. The method includes a process in which the NF 1 applies to an NRF and obtains a token corresponding to a service, and a process in which the NF 1 communicates with and interacts with the NF 2. A main difference between the method shown in the embodiment of FIG. 8 and the method shown in the embodiment of FIG. 7 is that a system architecture shown in the embodiment of FIG. 7 includes the NF 1, the NF 2, and the NRF, but a system architecture shown in the embodiment of FIG. 8 includes an NF 1, an NF 2, an NRF, and an SFSF. A specific description is as follows:

The process in which the NF 1 applies to the NRF and obtains the token corresponding to the service may include but is not limited to S1 to S5. For related specific content, refer to the descriptions of S1 to S5 in the embodiment of FIG. 7.

S1. The NRF obtains and stores a certificate of the NF 1.

S2. The NRF locally stores a mapping relationship between an instance ID of the NF 1 and third certificate information.

S3. The NF 1 sends a token obtaining request to the NRF. Optionally, the token obtaining request may further include related information of the certificate of the NF 1.

S4. The NRF calculates the token in an existing manner. The token may not include the third certificate information. For specific content, refer to the description of S4 in the embodiment of FIG. 7. Details are not described herein again.

S5. The NRF sends a token obtaining response to the NF 1. The token obtaining response carries the token.

The process in which the NF 1 communicates with and interacts with the NF 2 may include but is not limited to S6 to S13 (S13 includes S13-1 and S13-2). A description is as follows:

S6. The SFSF obtains the certificate of the NF 1.

In some possible embodiments, when mutual authentication (mutual authentication) is performed between the NF 1 and the SFSF, the NF 1 may send the certificate of the NF 1 to the SFSF. Correspondingly, the SFSF receives the certificate of the NF 1 and stores the certificate of the NF 1 locally in the SFSF.

In some other possible embodiments, after mutual authentication is performed between the NF 1 and the SFSF, the NF 1 may alternatively send the certificate of the NF 1 to the SFSF.

In some other possible embodiments, the certificate of the NF 1 may be alternatively preconfigured in the SFSF.

In addition, the SFSF may alternatively obtain the certificate of the NF 1 in another manner. This is not limited in the present invention.

It should be further noted that a sequence between S6 and any step in S1 to S5 is not limited in the present invention.

S7. The NF 1 sends an NF service request to the SFSF. The NF service request includes the token. Correspondingly, the SFSF receives the NF service request. For specific content, refer to the description of S7 in the embodiment of FIG. 7. Details are not described herein again. Optionally, the SFSF may not verify content in the token.

S8. The SFSF calculates fourth certificate information based on the certificate of the NF 1, and sends an instance ID of a requester of the token in the token and the fourth certificate information to the NRF. For a manner of calculating the fourth certificate information, refer to a manner of calculating the first certificate information/the third certificate information. Details are not described herein.

S9. The NRF determines, based on the stored mapping relationship between the instance ID of the NF 1 and the third certificate information of the NF 1, whether the instance ID of the requester of the token and the fourth certificate information that are received from the SFSF meet the mapping relationship. If the mapping relationship is met, it indicates that the verification succeeds. If the mapping relationship is not met, it indicates that the verification fails.

S10. If the verification in S9 succeeds, the NRF sends a verification result to the SFSF. The verification result is used to indicate that the verification succeeds.

It should be noted that, if the verification in S9 fails, the NRF sends a verification result to the SFSF. The verification result is used to indicate that the verification fails. The verification result may further directly indicate that the verification on the instance ID of the requester of the token fails.

S11. When the verification result indicates that the verification succeeds (that is, the verification in S9 succeeds), the SFSF forwards the NF service request to the NF 2. The NF service request includes the token.

Optionally, when the verification result indicates that the verification fails (that is, the verification in S9 fails), the SFSF may reject the NF service request (for example, discard the NF service request).

Optionally, when the verification result indicates that the verification succeeds, the SFSF sends a verification success indication to the NF 2.

S12. After the NF 2 receives the NF service request, the NF 2 verifies the token according to an existing technology. For details, refer to the description of S8 in the embodiment of FIG. 7.

S13-1. When the verification result of S9 indicates that the verification succeeds and the verification in S12 succeeds, the NF 2 executes the service requested by the NF 1, and sends an NF service response to the NF 1.

S13-2. Optionally, if at least one of the verification in S9 and the verification in S12 fails, the NF 2 sends an error response to the NF 1 by using the SFSF. Further, the error response may include an error indication. The error indication may be, for example, used to indicate that the verification on the instance ID of the requester of the token fails.

Optionally, if at least one of the verification in S9 and the verification in S12 fails, the NF 2 may send a reject message to the NF 1 by using the SFSF. The reject message is used to indicate that the NF 2 rejects the NF service request of the NF 1.

Optionally, if at least one of the verification in S9 and the verification in S12 fails, the NF 2 may alternatively directly discard the NF service request.

It should be noted that, if the fourth certificate information sent by the SFSF is different from the third certificate information stored in the NRF, when the NRF obtains the fourth certificate information sent by the SFSF, and the NRF stores hash of the certificate of the NF 1, the NRF may process the fourth certificate information by using the hash, so that the fourth certificate information is the same as the third certificate information.

It should be noted that, in some modified solutions, it may be designed to prestore the mapping relationship between the NF type of the NF 1 and the fourth certificate information of the NF 1 in the NRF, and it may be designed to add the NF type of the requester of the token to the token. In this way, whether the NF type of the requester of the token and the fourth certificate information that are received from the NF 2 meet the mapping relationship can be determined. If the mapping relationship is met, it indicates that the verification succeeds. If the mapping relationship is not met, it indicates that the verification fails. For specific content, refer to the foregoing procedure in the embodiment of FIG. 8 for implementation. Details are not described herein.

It may be learned that, in this embodiment of the present invention, the mapping relationship between the instance ID of the NF 1 and the third certificate information of the NF 1 is prestored in the NRF, to implement binding between the certificate and the token. In this way, the SFSF can first invoke the NRF to verify whether the fourth certificate information and the instance ID of the requester of the token in the token meet the mapping relationship, to determine whether an identity of the NF 1 and/or an NF type of the NF 1 are/is valid. If the identity of the NF 1 and/or the NF type of the NF 1 are/is valid, the NF 2 continues to verify the token; or otherwise, the NF 2 may reject the NF service request from the NF 1. Therefore, by implementing this embodiment of the present invention, in a process in which the NF 1 obtains the service from the NF 2, identity validity of the NF 1 can be verified, thereby improving service security and reducing power consumption overheads of the NF 2.

Figure 9:
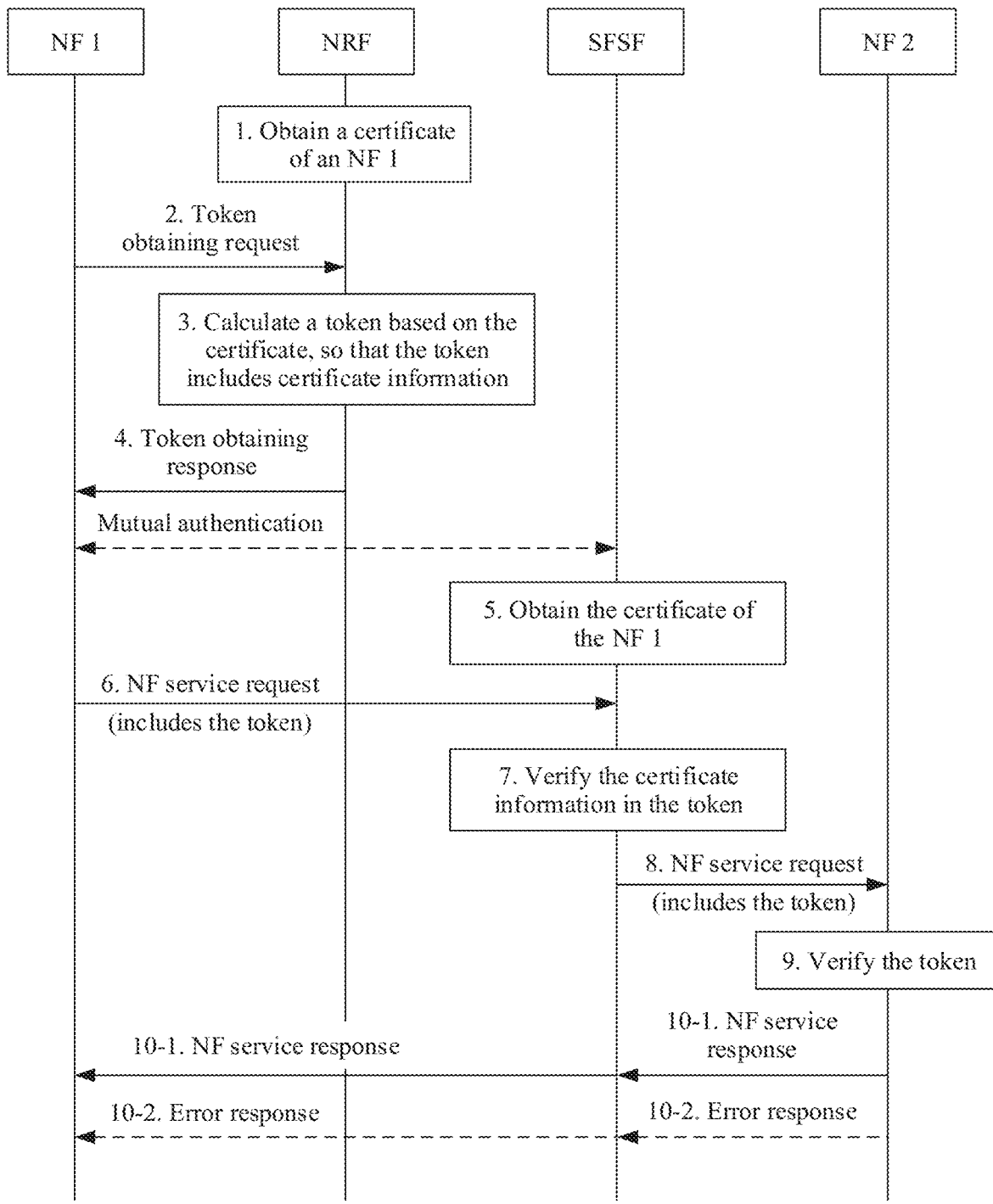
FIG. 9 is a schematic flowchart of another identity verification method for a network function service according to an embodiment of the present invention.

FIG. 9 is a schematic flowchart of another identity verification method for a network function service according to an embodiment of the present invention. In the method, an NF (or an NFS) used as a network function service consumer (NF service consumer) is referred to as an NF 1, and an NF (or an NFS) used as a network function service provider (NF service producer) is referred to as an NF 2. The method includes a process in which the NF 1 applies to an NRF and obtains a token corresponding to a service, and a process in which the NF 1 communicates with and interacts with the NF 2. A main difference between the method shown in the embodiment of FIG. 9 and the method shown in the embodiment of FIG. 8 is that the SFSF invokes the NRF to verify whether the fourth certificate information and the instance ID of the requester of the token in the token meet the mapping relationship to determine identity validity of the NF 1 in the embodiment of FIG. 8, but the SFSF may directly verify the certificate information in the token to determine the identity validity of the NF 1 in the embodiment of FIG. 8. A specific description is as follows:

The process in which the NF 1 applies to the NRF and obtains the token corresponding to the service may include but is not limited to S1 to S4. In some implementations, for specific content of S1 to S4, refer to the descriptions of S1 to S4 in the embodiment of FIG. 5. In some other implementations, for specific content of S1 to S4, refer to the descriptions of S1 to S4 in the embodiment of FIG. 6.

S1. The NRF obtains and stores a certificate of the NF 1.

S2. The NF 1 sends a token obtaining request to the NRF.

S3. The NRF calculates the token based on the certificate that is of the NF 1 and that is obtained in S1.

In some implementations, the token may include both third certificate information and an instance ID of the NF 1. In some other implementations, the token includes the third certificate information but does not include the instance ID of the NF 1.

S4. The NRF sends a token obtaining response to the NF 1. The token obtaining response carries the token.

The process in which the NF 1 communicates with and interacts with the NF 2 may include but is not limited to S5 to S10 (S10 includes S10-1 and S10-2). A description is as follows:

S5. The SFSF obtains the certificate of the NF 1. For details, refer to the related description of S6 in the embodiment of FIG. 8. Details are not described herein again.

S6. The NF 1 sends an NF service request to the SFSF. The NF service request includes the token. For specific content, refer to the description of S7 in the embodiment of FIG. 8. Details are not described herein again.

S7. The SFSF verifies first certificate information in the token.

A method in which the SFSF verifies the first certificate information in the token may be as follows: The SFSF may use a manner the same as that used by the NRF to obtain fourth certificate information through calculation based on the certificate of the NF 1 locally stored in the SFSF. Then, the SFSF verifies whether the fourth certificate information is the same as the first certificate information in the token. For example, the SFSF verifies whether a second identifier that is of the NF 1 and that is included in the fourth certificate information is the same as that included in the first certificate information, or verifies whether a type that is of the NF 1 and that is included in the fourth certificate information is the same as that included in the first certificate information. If the fourth certificate information is the same as the first certificate information in the token, the verification on the first certificate information succeeds. It indicates that a requester of the token and a requester of the service are a same NF (that is, the NF 1). Otherwise, the verification on the first certificate information fails. It indicates that a requester of the token and a requester of the service may be not a same NF (that is, the token may be stolen).

S8. When the verification succeeds, the SFSF forwards the NF service request to the NF 2. The NF service request includes the token.

Optionally, when the verification in S7 fails, the SFSF may reject the NF service request (for example, discard the NF service request).

S9. After the NF 2 receives the NF service request, the NF 2 verifies the token according to an existing technology. For details, refer to the description of S12 in the embodiment of FIG. 8.

S10-1. When the verification in S7 succeeds and the verification in S9 succeeds, the NF 2 executes the service requested by the NF 1, and sends an NF service response to the NF 1.

S13-2. Optionally, if at least one of the verification in S7 and the verification in S9 fails, the NF 2 sends an error response to the NF 1 by using the SFSF. Further, the error response may include an error indication. The error indication may be, for example, used to indicate that the verification on the instance ID of the requester of the token fails.

Optionally, if at least one of the verification in S7 and the verification in S9 fails, the NF 2 may send a reject message to the NF 1 by using the SFSF. The reject message is used to indicate that the NF 2 rejects the NF service request of the NF 1.

Optionally, if at least one of the verification in S7 and the verification in S9 fails, the NF 2 may alternatively directly discard the NF service request.

In this embodiment of the present invention, the token is designed to carry the certificate information, to implement binding between the certificate and the token. In this way, the SFSF can first use the locally stored certificate of the NF 1 to verify the certificate information carried in the token, to determine whether an identity of the NF 1 and/or an NF type of the NF 1 are/is valid. If the identity of the NF 1 and/or the NF type of the NF 1 are/is valid, the NF 2 continues to verify the token; or otherwise, the NF 2 may reject the NF service request from the NF 1. Therefore, by implementing this embodiment of the present invention, in a process in which the NF 1 obtains the service from the NF 2, identity validity of the NF 1 can be verified, thereby improving service security and reducing power consumption overheads of the NF 2.

Figure 10:
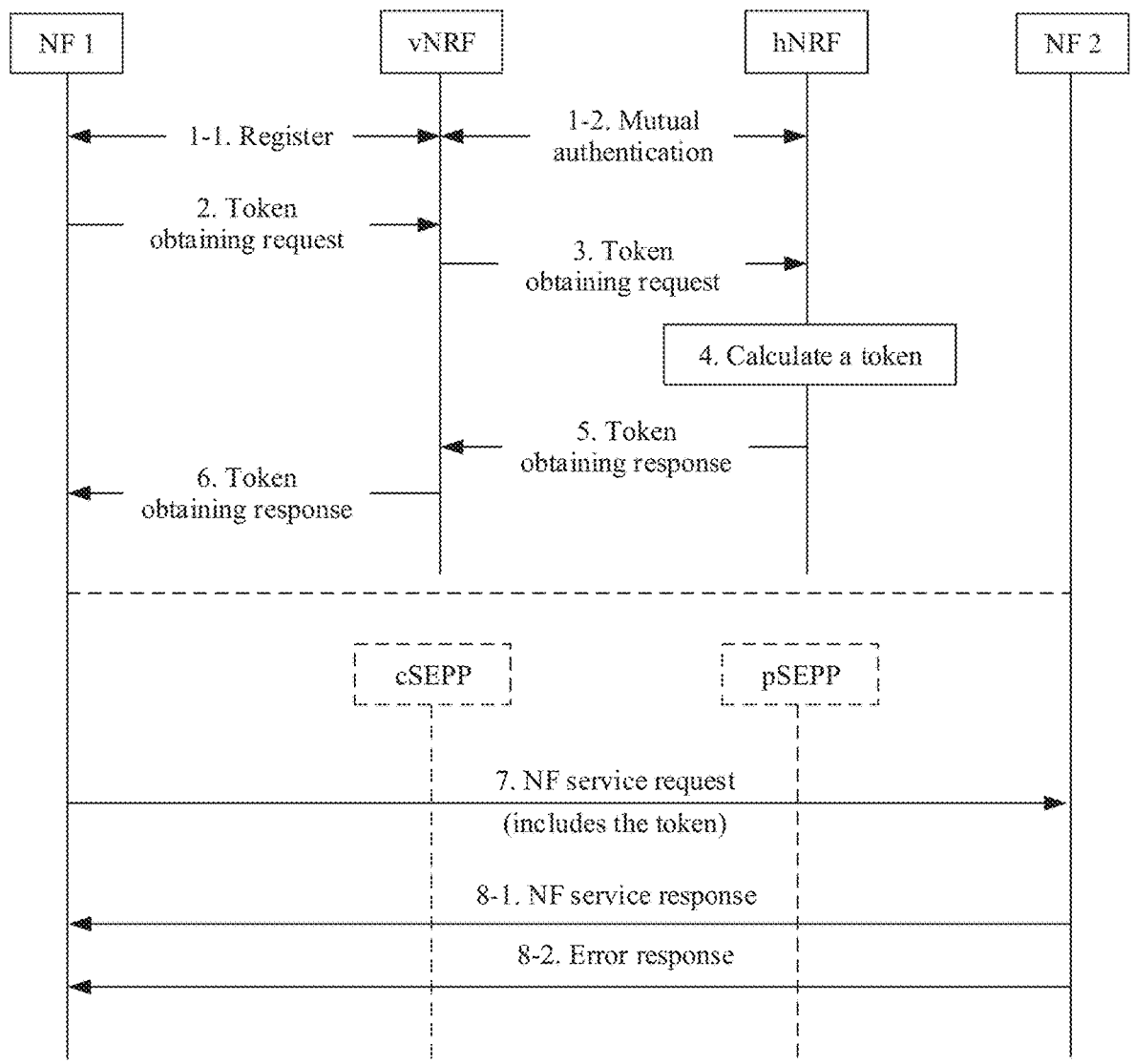
FIG. 10 is a schematic flowchart of another identity verification method for a network function service according to an embodiment of the present invention.

FIG. 10 is a schematic flowchart of another identity verification method for a network function service according to an embodiment of the present invention. The flowchart is an example of the method in a roaming scenario based on any embodiment of the embodiments of FIG. 5 to FIG. 9 described above.

In the method, an NF (or an NFS) used as a network function service consumer (NF service consumer) is referred to as an NF 1, and an NF (or an NFS) used as a network function service provider (NF service producer) is referred to as an NF 2. The method includes a process in which the NF 1 registers with an NRF and obtains a token corresponding to a service, and a process in which the NF 1 communicates with and interacts with the NF 2.

The process in which the NF 1 registers with the NRF and obtains the token corresponding to the service may be described as follows: S1-1. The NF 1 completes registration with a first type of authorization service node vNRF. S1-2. Mutual authentication is completed between the first type of authentication service node vNRF and a second type of authentication service node hNRF. S2. The NF 1 sends a token obtaining request to the vNRF. S3. The vNRF further sends the token obtaining request to the hNRF. S4. The hNRF may write, into the token, certificate information (or referred to as third certificate information) that is of the NF 1 and that is locally generated by the hNRF. Alternatively, the token may not include certificate information. The hNRF locally stores a mapping relationship between the certificate information of the NF 1 and an instance ID of the NF 1, or a mapping relationship between the certificate information of the NF 1 and an NF type of the NF 1. S5. The hNRF returns a token obtaining response to the vNRF. S6. The vNRF returns the token obtaining response to the NF 1. In this way, the NF 1 has the authorized token.

The process in which the NF 1 communicates with and interacts with the NF 2 may be described as follows: S7. The NF 1 sends an NF service request to the NF 2 based on transparent transmission performed by proxy nodes: a cSEPP and a pSEPP based on edge security protection. The NF service request includes the token.

Optionally, if the token includes certificate information (or referred to as first certificate information), the NF 2 may further verify the certificate information to determine that a requester of the token and a requester of the service are a same NF (that is, the NF 1).

Optionally, if the token does not include certificate information, the NF 2 may further invoke the hNRF to verify that a requester of the token and a requester of the service are a same NF (that is, the NF 1).

It may be understood that extension/application may be performed on the embodiments of FIG. 5, FIG. 6, and FIG. 7 based on a procedure in the embodiment of FIG. 10. Details are not described herein.

In a possible embodiment, an interaction process between the NF 1 and the NF 2 further includes participation of an SFSF. For a specific process, refer to the embodiments of FIG. 8 and FIG. 9 for implementation. Details are not described herein.

In a possible embodiment, after the pSEPP receives the token, the pSEPP may also perform a verification action based on the token, which is similar to the verification performed by the SFSF. For a specific process, refer to the embodiments of FIG. 8 and FIG. 9 for implementation. Details are not described herein.

After verification on an identity of the NF 1 and verification on the token both succeed, in S8-1, the NF 2 executes the service requested by the NF 1, and sends an NF service response to the NF 1. Optionally, if at least one of verification on an identity of the NF 1 and verification on the token fails, in S8-2, an error response, an error indication, or a reject message may be sent to the NF 1. Optionally, the NF 2 may alternatively directly discard the NF service request.

It should be noted that, in a possible implementation, two SEPPs may be included in the roaming scenario. One SEPP is the cSEPP deployed in a network in which the NF 1 is located, and the other SEPP is the pSEPP deployed in a network in which the NF 2 is located. The cSEPP receives the token sent by the NF 1, and then verifies the token. For similar content, refer to steps S7 to S10 in the embodiment of FIG. 8 or steps S6 and S7 in the embodiment of FIG. 9. If the verification on the token succeeds, the cSEPP sends the token to the pSEPP, and the pSEPP sends the token to the NF 2. If the verification on the token fails, the cSEPP sends an error response, an error indication, or a reject message to the NF 1. Optionally, the cSEPP may discard the message. Alternatively, optionally, the cSEPP sends an error response, an error indication, or a reject message to the NF 1. Alternatively, optionally, the cSEPP may indicate, by using an error response, an error indication, or a reject message, that the verification on the token fails.

It should be further noted that, for any foregoing provided embodiment of the present invention, when a system architecture includes the SFSF, the SFSF may specifically include an SFSF 1 on an NF 1 side and an SFSF 2 on an NF 2 side.

In a possible implementation, the SFSF 1 receives the token sent by the NF 1, and then verifies the token. For similar content, refer to steps S7 to S10 in the embodiment of FIG. 8 or steps S6 and S7 in the embodiment of FIG. 9. If the verification on the token succeeds, the SFSF 1 sends the token to the SFSF 2, and the SFSF 2 further sends the token to the NF 2.

In another possible implementation, the cSEPP and the pSEPP may be further deployed between the SFSF 1 and the SFSF 2. The SFSF 1 receives the token sent by the NF 1, and then verifies the token. In this case, if the verification succeeds, the SFSF 1 sends the token to the cSEPP, and the cSEPP sends the token to the NF 2 by using the pSEPP, or the cSEPP sends the token to the NF 2 by using the pSEPP and the SFSF 2. If the verification on the token fails, optionally, the SFSF 1 may discard the message. Alternatively, optionally, the SFSF 1 sends an error response, an error indication, or a reject message to the NF 1. Alternatively, optionally, the SFSF 1 may indicate, by using an error response, an error indication, or a reject message, that the verification on the token fails.

It should be further noted that the foregoing embodiments are mainly described from perspectives of how to generate a token, how to add certificate information in a generated token, and how to verify a token; and further describe a verification manner of binding certificate information and an instance ID of the NF 1 or an NF type of the NF 1. The embodiments of the present invention further provide some possible existing parameters in the token for full description of the embodiments. The embodiments of the present invention do not limit writing and verification of another parameter that is in the token and that is not mentioned in this specification, whether the token includes another new parameter, whether some parameters in the token are reduced, or the like.

Further, for any foregoing embodiment of the present invention, two (or more) types of identity verification may exist in identity verification. For example, the instance ID of the NF 1 and the certificate information may be both verified. For another example, the NF type of the NF 1 and the certificate information may be both verified. Correspondingly, an error indication (or an error message, or an error response, or a reject message) generated when the identity verification fails may be used to indicate that the verification fails, or used to indicate that the verification in each of the two identity verification manners fails, or used to indicate that the verification in at least one identity verification manner fails.

Further, in a possible embodiment of the present invention, the identity verification may further include more types of verification, for example, verification on a digital signature (Sign). The following uses embodiments of FIG. 14 and FIG. 15 as an example for a specific description of a related solution.

Figure 14:
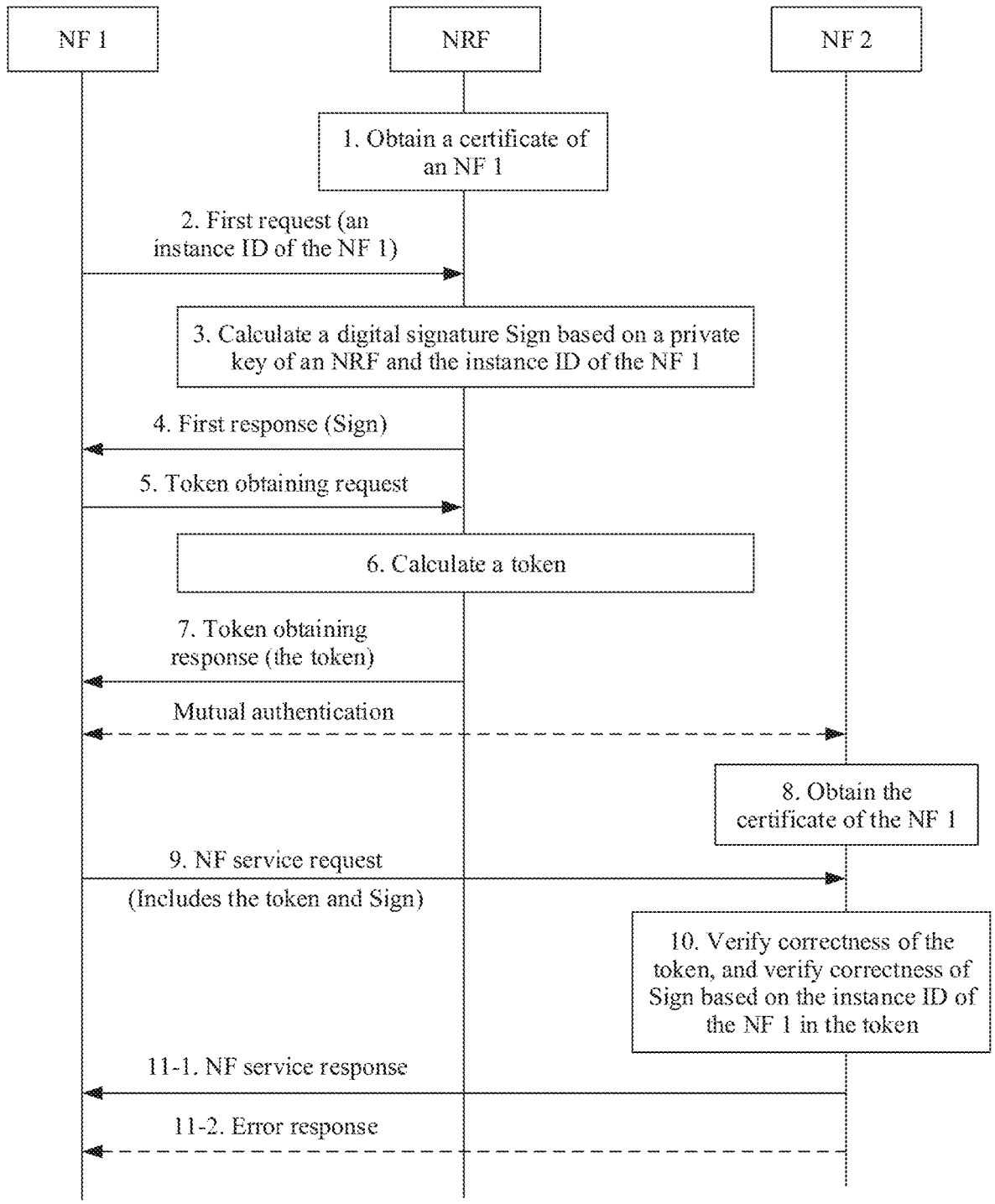
FIG. 14 is a schematic flowchart of another identity verification method for a network function service according to an embodiment of the present invention.

FIG. 14 is a schematic flowchart of another identity verification method for a network function service according to an embodiment of the present invention. The method includes a process in which an NF 1 applies to an NRF and obtains a digital signature (Sign) and a token corresponding to a service, and a process in which the NF 1 communicates with and interacts with the NF 2.

The process in which the NF 1 applies to the NRF and obtains the digital signature (Sign) and the token corresponding to the service may include but is not limited to S1 to S7. A description is as follows:

S1. The NRF obtains and stores a certificate of the NF 1. Refer to the related description of step S1 in the embodiment of FIG. 5. Details are not described herein again.

S2. The NF 1 sends a first request to the NRF. The first request carries an instance ID of the NF 1.

In a specific implementation, the first request may be a registration request, a discovery request, or the like. This is not limited in the present invention.

S3. The NRF calculates the digital signature (Sign) based on a private key of the NRF and the instance ID of the NF 1.

In some more specific implementations, in addition to the private key of the NRF and the instance ID of the NF 1, parameters used for calculating Sign may further include at least one of the following parameters: the certificate of the NF 1, an identifier of the NF 1 in the certificate of the NF 1, a type of the NF 1 in the certificate of the NF 1, hash of the certificate of the NF 1, hash of an identifier of the NF 1 in the certificate of the NF 1, or hash of a type of the NF 1 in the certificate of the NF 1.

In an alternative solution of step S3, the NRF may alternatively calculate Sign based on a private key of the NRF and hash of the instance ID of the NF 1.

Likewise, in some more specific implementations, in addition to the private key of the NRF and the hash of the instance ID of the NF 1, parameters used for calculating Sign may further include at least one of the following parameters: the certificate of the NF 1, an identifier of the NF 1 in the certificate of the NF 1, a type of the NF 1 in the certificate of the NF 1, hash of the certificate of the NF 1, hash of an identifier of the NF 1 in the certificate of the NF 1, or hash of a type of the NF 1 in the certificate of the NF 1.

S4. The NRF sends a first response to the NF 1. The first response carries Sign obtained in S3.

S5. The NF 1 sends a token obtaining request to the NRF.

S6. The NRF calculates the token.

S7. The NRF sends a token obtaining response to the NF 1. The token obtaining response carries the token.

For S5 to S7, in an optional embodiment, the token may alternatively carry certificate information of the NF 1. In other words, specifically, S6 is as follows: The NRF calculates the token based on the certificate that is of the NF 1 and that is obtained in S1. In this case, for specific implementation of S4 to S7, refer to S2 to S4 in the embodiment of FIG. 5. Details are not described herein again.

For S5 to S7, in another optional embodiment, the token may alternatively not carry certificate information of the NF 1. In other words, the token may be calculated by using an existing general method (an existing technology) in S6.

In addition, another construction manner of the token is not limited in the present invention.

The process in which the NF 1 communicates with and interacts with the NF 2 may include but is not limited to S8 to S11 (S11 includes S11-1 and S11-2). A description is as follows:

S8. The NF 2 obtains the certificate of the NF 1.

S9. The NF 1 sends an NF service request. The NF service request carries the token and Sign. Correspondingly, the NF 2 receives the NF service request.

S10. The NF 2 verifies correctness of the token, and verifies correctness of Sign based on the instance ID of the NF 1 in the token.

Specifically, the NF 2 may first verify the correctness of the token and Sign.

If the token is obtained in the manner shown in S6 in the embodiment of FIG. 5, the token may be verified in the manner shown in S7 in the embodiment of FIG. 5.

If the token is obtained according to an existing technology, the token may be verified by using an existing method. If the verification on the token fails, optionally, the NF 2 may discard the message. Alternatively, optionally, the NF 2 sends an error response, an error indication, or a reject message to the NF 1.

Another form of verification on the token is not limited.

Then, the NF 2 verifies the correctness of Sign. Specifically, the NF 2 may verify the correctness of Sign based on the certificate of the NF 1, the instance ID of the NF 1, and a public key of the NRF. If the verification on Sign fails, optionally, the NF 2 may discard the message. Optionally, the NF 2 sends an error response, an error indication, or a reject message to the NF 1. Alternatively, optionally, the NF 2 may indicate, by using an error response, an error indication, or a reject message, that the verification on Sign fails.

A sequence of verifying the token and Sign is not limited.

S11-1. The NF 2 executes the service requested by the NF 1, and sends an NF service response to the NF 1.

S11-2. Optionally, the NF 2 may send an error response to the NF 1.

For implementation of S11-1 and S11-2, refer to the foregoing descriptions of S8-1 and S8-2 in the embodiment of FIG. 5. Details are not described herein again.

In this embodiment of the present invention, the NF service request is designed to carry the token and Sign. In some implementations, the token may further carry the certificate information to implement binding between the certificate and the token. In this way, the NF 2 can not only verify the token and Sign, but also verify, based on the locally stored certificate of the NF 1, the certificate information carried in the token. In this way, the NF 2 determines whether an identity of the NF 1 and/or an NF type of the NF 1 are/is valid. Therefore, by implementing this embodiment of the present invention, in a process in which the NF 1 obtains the service from the NF 2, identity validity of the NF 1 can be verified, thereby improving service security. In addition, a potential security risk is prevented, for example, a risk that an attacker steals the token.

Figure 15:
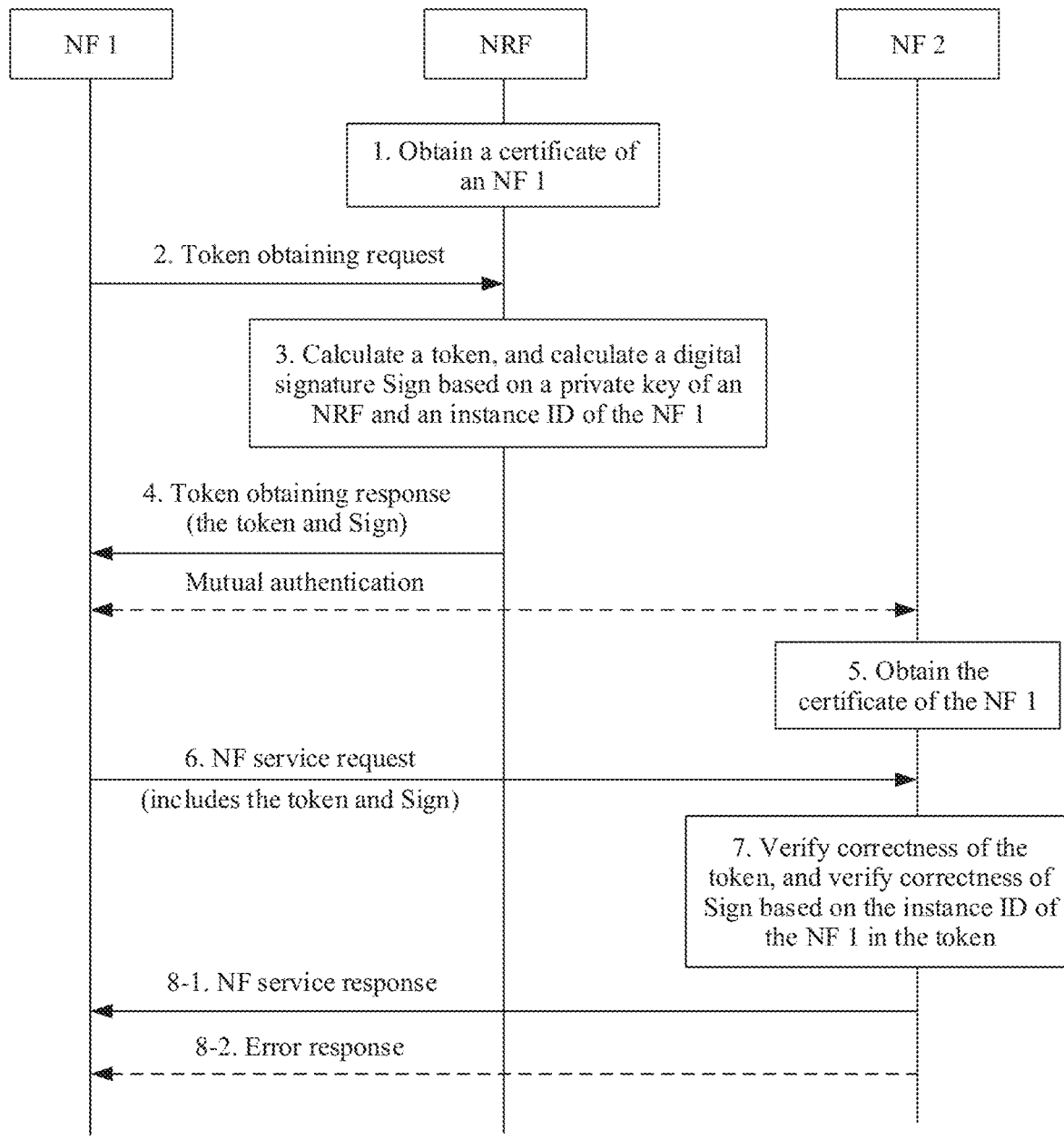
FIG. 15 is a schematic flowchart of another identity verification method for a network function service according to an embodiment of the present invention.

FIG. 15 is a schematic flowchart of another identity verification method for a network function service according to an embodiment of the present invention. A main difference between the embodiment of FIG. 15 and the embodiment of FIG. 14 is that, in the embodiment of FIG. 15, an NRF calculates Sign in a process of obtaining a token, adds Sign to a token obtaining response, and sends the token obtaining response to an NF 1. The method includes a process in which the NF 1 applies to the NRF and obtains a digital signature (Sign) and a token corresponding to a service, and a process in which the NF 1 communicates with and interacts with an NF 2.

The process in which the NF 1 applies to the NRF and obtains the digital signature (Sign) and the token corresponding to the service may include but is not limited to S1 to S4. A description is as follows:

S1. The NRF obtains and stores a certificate of the NF 1. Refer to the related description of step S1 in the embodiment of FIG. 5. Details are not described herein again.

S2. The NF 1 sends a token obtaining request to the NRF. Refer to the related description of step S2 in the embodiment of FIG. 5. Details are not described herein again.

S3. The NRF calculates the token, and the NRF calculates Sign based on a private key of the NRF and an instance ID of the NF 1.

For a specific implementation of calculating the token by the NRF, refer to the related description of step S6 in the embodiment of FIG. 15. In other words, in an optional embodiment, the NRF calculates the token based on the certificate that is of the NF 1 and that is obtained in S1, that is, the token carries certificate information of the NF 1. In another optional embodiment, the token may be calculated by using an existing general method (an existing technology), that is, the token does not carry certificate information of the NF 1.

For a specific implementation of calculating Sign by the NRF, refer to the related description of step S3 in the embodiment of FIG. 14. Details are not described herein again.

S4. The NRF sends a token obtaining response to the NF 1. The token obtaining response carries the token and Sign.

The process in which the NF 1 communicates with and interacts with the NF 2 may include but is not limited to S5 to S8 (S8 includes S8-1 and S8-2). A description is as follows:

S5. The NF 2 obtains the certificate of the NF 1.

S6. The NF 1 sends an NF service request. The NF service request carries the token and Sign. Correspondingly, the NF 2 receives the NF service request.

S7. The NF 2 verifies correctness of the token, and verifies correctness of Sign based on the instance ID of the NF 1 in the token.

A sequence of verifying the token and Sign is not limited.

For a specific implementation of this step, refer to the related description of step S10 in the embodiment of FIG. 15. Details are not described herein again.

S8-1. The NF 2 executes the service requested by the NF 1, and sends an NF service response to the NF 1.

S8-2. Optionally, the NF 2 may send an error response to the NF 1.

For implementation of S8-1 and S8-2, refer to the foregoing descriptions of S8-1 and S8-2 in the embodiment of FIG. 5. Details are not described herein again.

In this embodiment of the present invention, the NF service request is designed to carry the token and Sign. In some implementations, the token may further carry the certificate information to implement binding between the certificate and the token. In this way, the NF 2 can not only verify the token and Sign, but also verify, based on the locally stored certificate of the NF 1, the certificate information carried in the token. In this way, the NF 2 determines whether an identity of the NF 1 and/or an NF type of the NF 1 are/is valid. Therefore, by implementing this embodiment of the present invention, in a process in which the NF 1 obtains the service from the NF 2, identity validity of the NF 1 can be verified, thereby improving service security. In addition, a potential security risk is prevented, for example, a risk that an attacker steals the token.

Figure 16:
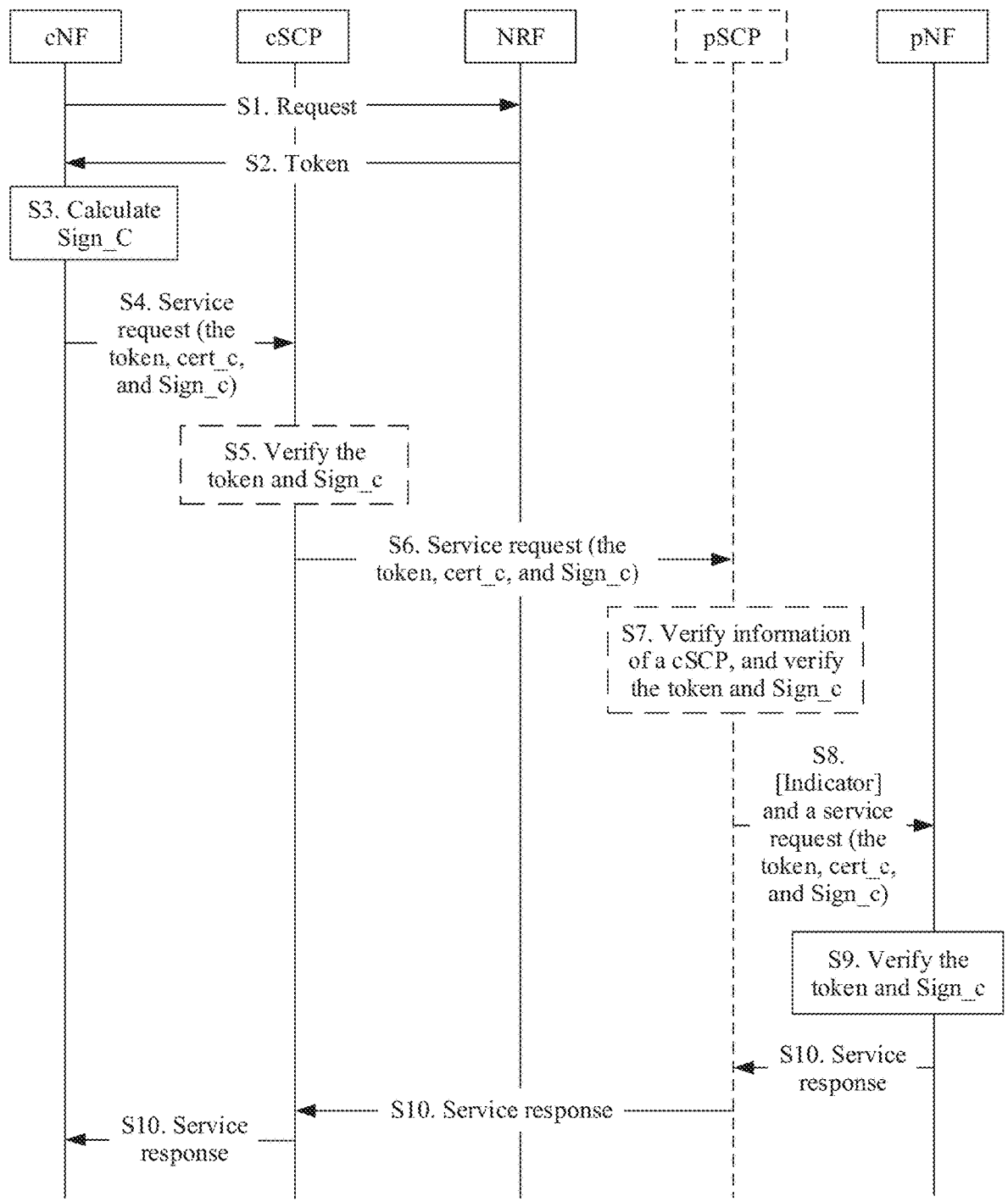
FIG. 16 is a schematic flowchart of another identity verification method for a network function service according to an embodiment of the present invention.

FIG. 16 is a schematic flowchart of another identity verification method for a network function service according to an embodiment of the present invention. In this embodiment, an identity of a cNF in a certificate cert_C of the cNF is the same as an identity of the cNF in a token. For example, the two identities may be both an instance ID of the cNF.

Specific steps are as follows:

S0. The cNF has the certificate Cert_c. The identity of the cNF in the certificate is the same as the identity of the cNF in the token. For example, the identities may be the instance ID of the cNF.

S1. The cNF sends a request to an NRF to obtain the token through the request.

S2. After the NRF authorizes the request of the cNF, the NRF calculates and sends the token to the cNF. The token includes the instance ID of the cNF.

The process of obtaining the token uses a disclosed method. This is not limited.

S3. The cNF obtains a digital signature Sign_C through calculation based on a private key corresponding to a public key in cert_C, and performs integrity protection on at least one of the following information:
the token;
information of a cSCP, for example, an instance ID of the cSCP, address-related information (for example, an FQDN, an IP address, or a MAC address) of the cSCP, a group ID of the cSCP, and a set ID of the cSCP;
information of a pNF, for example, a type of the pNF, address-related information (for example, an FQDN, an IP address, or a MAC address) of the pNF, a group ID of the pNF, and a set ID of the pNF; and
slice information, for example, an NSI ID and an S-NS-SAI.

It may also be understood that the cNF performs integrity protection on an entire service request to generate Sign_C (the entire message includes at least one of the foregoing).

S4. The cNF sends a service request message to the cSCP. The service request message includes parameters used for calculating Sign_C in the third step: the token, cert_C, Sign_C, and the like. Herein, cert_C is optionally sent. The cSCP may also receive cert_C by using a process (for example, a TLS) in which a secure connection is established to the cNF. Alternatively, the cSCP is configured with the certificate cert_C of the cNF.

S5. Optionally, the cSCP verifies the service request. The cSCP executes at least one of the following verifications:
Verify correctness of Sign_C based on Cert_C, that is, verify the correctness of Sign_C based on the public key in Cert_C.
Optionally, verify whether information of the cSCP in Sign_C is consistent with information of the cSCP.
Optionally, verify whether the identity of the cNF in Cert_C is consistent with the identity of the cNF in the token.

After the foregoing verification succeeds, the cSCP continues execution. Otherwise, the cSCP may discard the message, or may send an error code to the cNF to indicate that the verification fails. The error code herein may be alternatively an error code used to indicate specific verification that fails.

S6. The cSCP sends the service request to a pSCP. If S4 does not include Cert_C, the message sent by the cSCP to the pSCP needs to carry Cert_C. Optionally, the cSCP sends an indicator to indicate that the verification in step S5 succeeds.

If there is only one SCP between the cNF and the pNF, the cSCP sends the service request to the pNF.

S7. Optionally, the pSCP verifies the service request. If the pSCP receives the indicator indicating that the verification in S5 succeeds, a verification result of S5 may be trusted. Optionally, an overlapping verification action between S7 and S5 is reduced. The pSCP may establish a TLS link to the cSCP to obtain a certificate of the cSCP. The pSCP executes at least one of the following verifications:
Verify whether information of the cSCP in Sign_C in the service request is consistent with information of the cSCP in the certificate of the cSCP.
Optionally, verify whether information of the cSCP in Sign_C is consistent with information that is of the cSCP and that is received by the pSCP.
Optionally, verify whether the identity of the cNF in Cert_C is consistent with the identity of the cNF in the token.

After the foregoing verification succeeds, the pSCP continues execution. Otherwise, the pSCP may discard the message, or may send an error code to the cSCP to indicate that the verification fails. The error code herein may be alternatively an error code used to indicate specific verification that fails.

S8. The pSCP sends the service request to the pNF. Optionally, the pSCP sends an indicator to indicate that the verification in step S7 succeeds.

S9. The pNP executes at least one of the following verifications:
Verify whether the token is correct, which belongs to an existing technology.

Verify based on the received cert_C whether Sign_C is correct.

Verify whether an instance ID of the cNF in the token is consistent with an instance ID of the cNF in cert_C.

Optionally, if the indicator is received, verification work in S9 may be reduced based on the part of verification performed by the pSCP.

S10. If the foregoing verification succeeds, the pNF completes authorization on the service request of the cNF, and sends a service response value to the cNF by using the pSCP and the cSCP. Otherwise, if the verification fails, the pNF may discard the message, or may send an error code to the pSCP or the cNF to indicate that the verification fails. The error code herein may be alternatively an error code used to indicate specific verification that fails.

In this embodiment of the present invention, an entire identity verification procedure of the cNF is simplified by designing that the identity of the cNF in the certificate of the cNF is the same as the identity of the cNF in the token. In addition, the certificate and the signature are introduced, so that the pNF can determine whether the identity of the cNF is consistent with the identity in the token. In addition, there may be a plurality of SCP nodes herein. For example, the cSCP communicates with the pSCP by using an SCPx. In this case, for a verification mechanism of the SCPx, refer to verification of the pSCP.

In this embodiment of the present invention, the vNRF represents a visited NRF, and the hNRF represents a home NRF. Certainly, it is also possible that the cNF belongs to the hNRF, and the pNF belongs to the vNRF. A plurality of deployment manners are not excluded.

Figure 17:
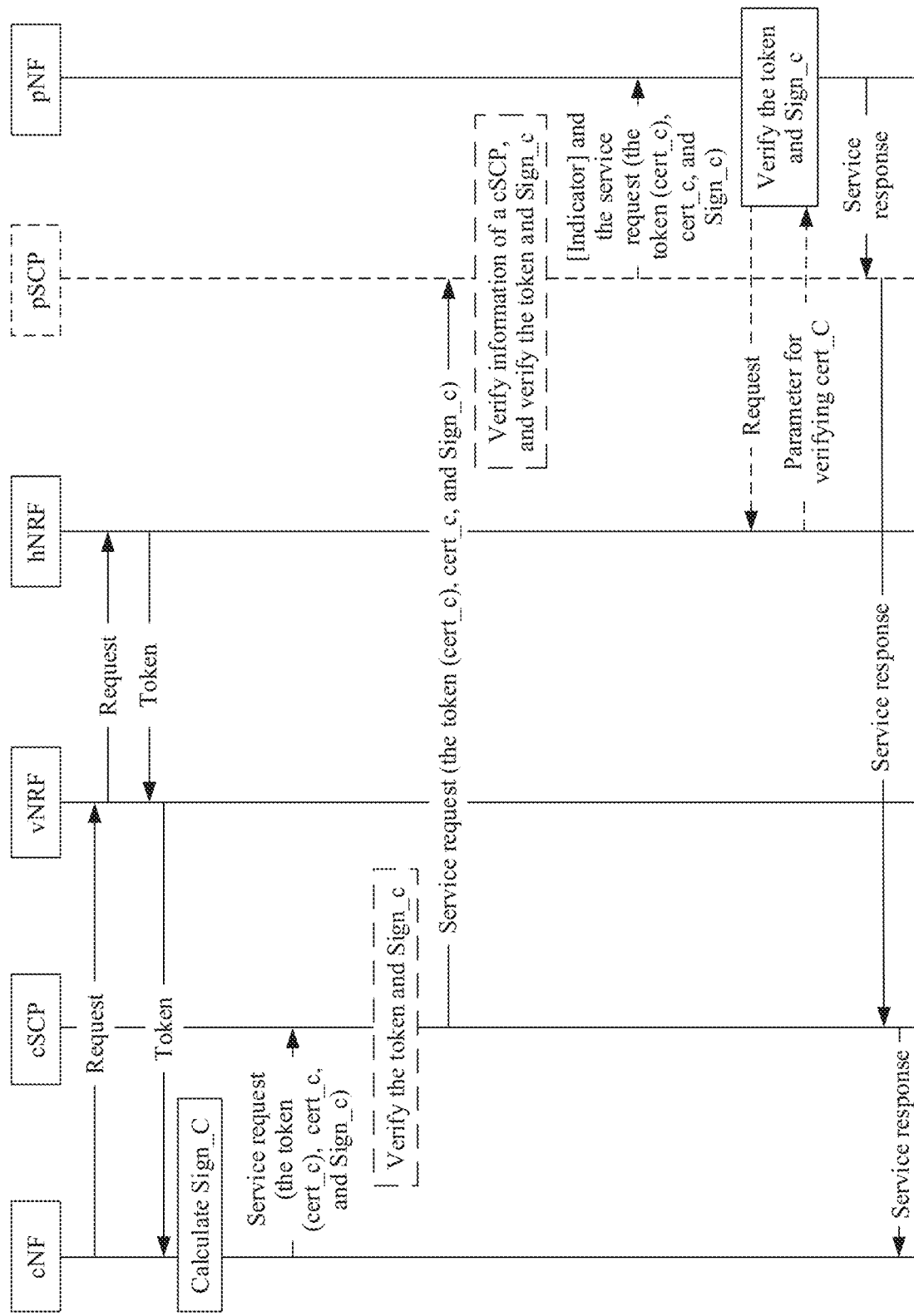
FIG. 17 is a schematic flowchart of another identity verification method for a network function service according to an embodiment of the present invention.

FIG. 17 is a schematic flowchart of another identity verification method for a network function service according to an embodiment of the present invention. A roaming scenario is considered in FIG. 17 based on FIG. 16. In other words, a cNF and a pNF may be deployed in different carrier networks. A difference between the method described in FIG. 17 and the method described in FIG. 16 is that the pNF may not store a parameter that can be used to verify Cert_C, for example, a root certificate or a root public key. After a token is obtained, the pNF may request from an hNRF or another NF to obtain a parameter for verifying Cert_C, and then verify Cert_C. In addition, another difference is that a cSCP cannot be directly connected to a pSCP during roaming. The cSCP may be connected to the pSCP by using a cSEPP and a pSEPP. Therefore, the pSCP cannot directly obtain a certificate of the cSCP or information of the cSCP, and cannot perform the part of verification on the information of the cSCP in FIG. 16. Herein, the cSEPP may execute the verification content of the pSCP in FIG. 16 because the cSEPP may be directly connected to the cSCP. After the verification succeeds, the cSEPP sends a message to the pSEPP. Optionally, the message may carry a verification success indication. If the verification fails, a processing manner is the same as that used by the pSCP. In addition, the pSEPP may execute a same verification action and a same processing action of the pSCP in the foregoing method corresponding to FIG. 16.

Figure 18:
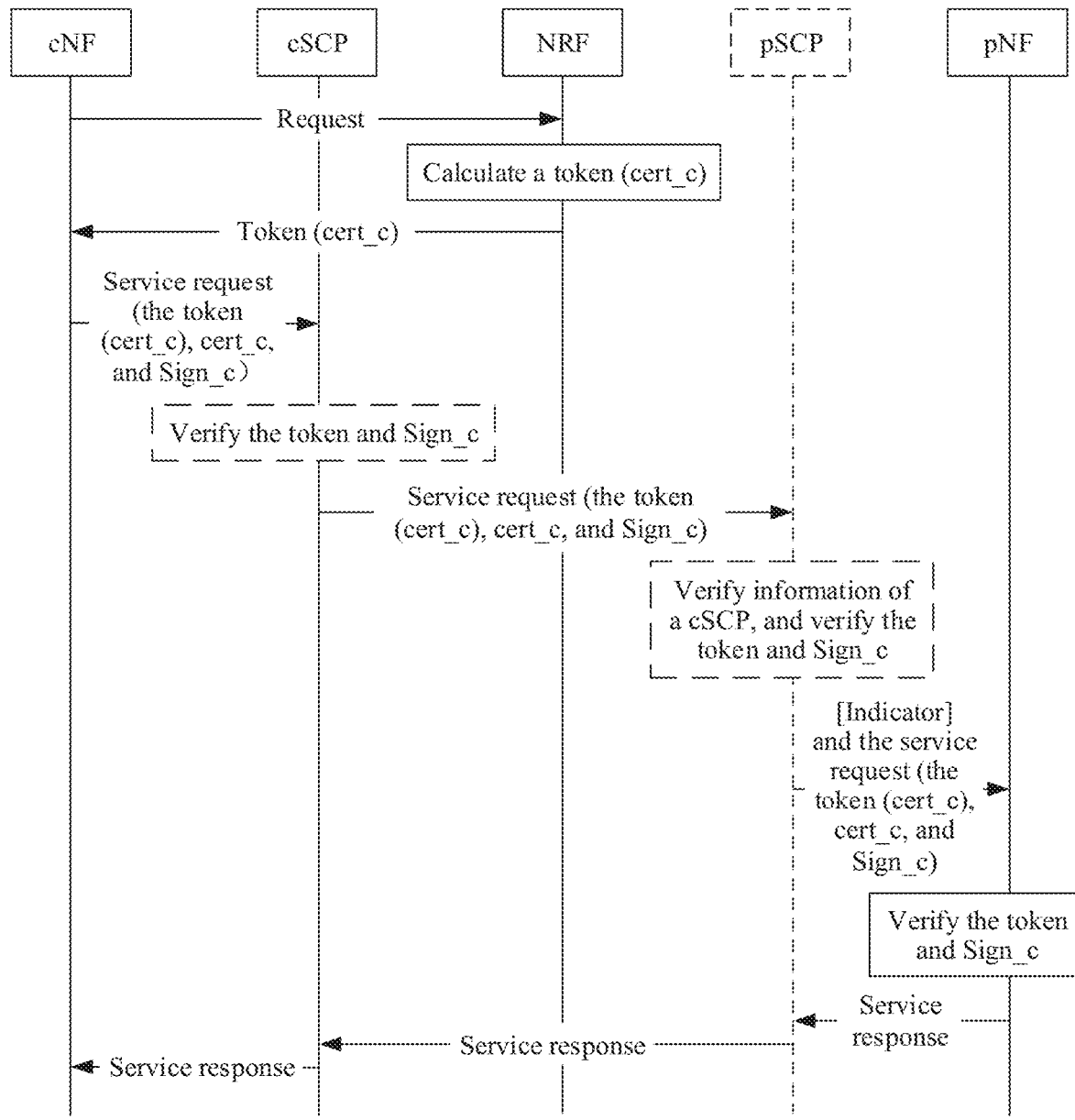
FIG. 18 is a schematic flowchart of another identity verification method for a network function service according to an embodiment of the present invention.

FIG. 18 is a schematic flowchart of another identity verification method for a network function service according to an embodiment of the present invention. Verification of a pSCP is added in FIG. 18 based on FIG. 9. The SFSF in FIG. 9 is an SCP in FIG. 18. The following describes different parts.

A service request includes a token, Cert_C, and Sign_C. Herein, Sign_C is based on step S3 in FIG. 16.

For a newly added verification action of a cSCP, refer to the verification in S5 in FIG. 17. Specifically, optionally, the cSCP verifies the service request. The cSCP may establish a TLS link to a cNF to obtain the certificate Cert_C of the cNF. The cSCP executes at least one of the following verifications:

Verify correctness of Sign_C based on Cert_C, that is, verify the correctness of Sign_C based on a public key in Cert_C.

Optionally, verify whether information of the cSCP in Sign_C is consistent with information of the cSCP.

Optionally, verify whether an identity of the cNF in Cert_C is consistent with an identity of the cNF in the token.

After the foregoing verification succeeds, the cSCP continues execution. Otherwise, the cSCP may discard the message, or may send an error code to the cNF to indicate that the verification fails. The error code herein may be alternatively an error code used to indicate specific verification that fails.

The cSCP sends the service request to the pSCP. The service request includes the token, Cert_C, and Sign_C.

For a newly added verification action of the pSCP, refer to the verification in S7 in FIG. 17. Specifically, optionally, the pSCP verifies the service request. The pSCP may establish a TLS link to the cSCP to obtain a certificate of the cSCP. The pSCP executes at least one of the following verifications:

Verify whether information of the cSCP in Sign_C in the service request is consistent with information in the certificate of the cSCP.

Optionally, verify whether information of the cSCP in Sign_C is consistent with information that is of the cSCP and that is received by the pSCP.

Optionally, verify whether information in Cert_C is consistent with information of the certificate in the token.

After the foregoing verification succeeds, the pSCP continues execution. Otherwise, the pSCP may discard the message, or may send an error code to the cSCP to indicate that the verification fails. The error code herein may be alternatively an error code used to indicate specific verification that fails.

Then, the pSCP sends the service request to the pNF. Optionally, the pSCP sends an indicator to indicate that the foregoing verification succeeds.

The pNP executes at least one of the following verifications:

Verify whether the token is correct, which belongs to an existing technology.

Verify based on the received cert_C whether Sign_C is correct.

Verify whether an instance ID of the cNF in the token is consistent with an instance ID of the cNF in cert_C.

Optionally, if the indicator is received, verification work in S9 may be reduced based on the part of verification performed by the pSCP. If the foregoing verification succeeds, the pNF completes authorization on the service request of the cNF, and sends a service response value to the cNF by using the pSCP and the cSCP. Otherwise, if the verification fails, the pNF may discard the message, or may send an error code to the cSCP or the cNF to indicate that the verification fails. The error code herein may be alternatively an error code used to indicate specific verification that fails.

Figure 19:
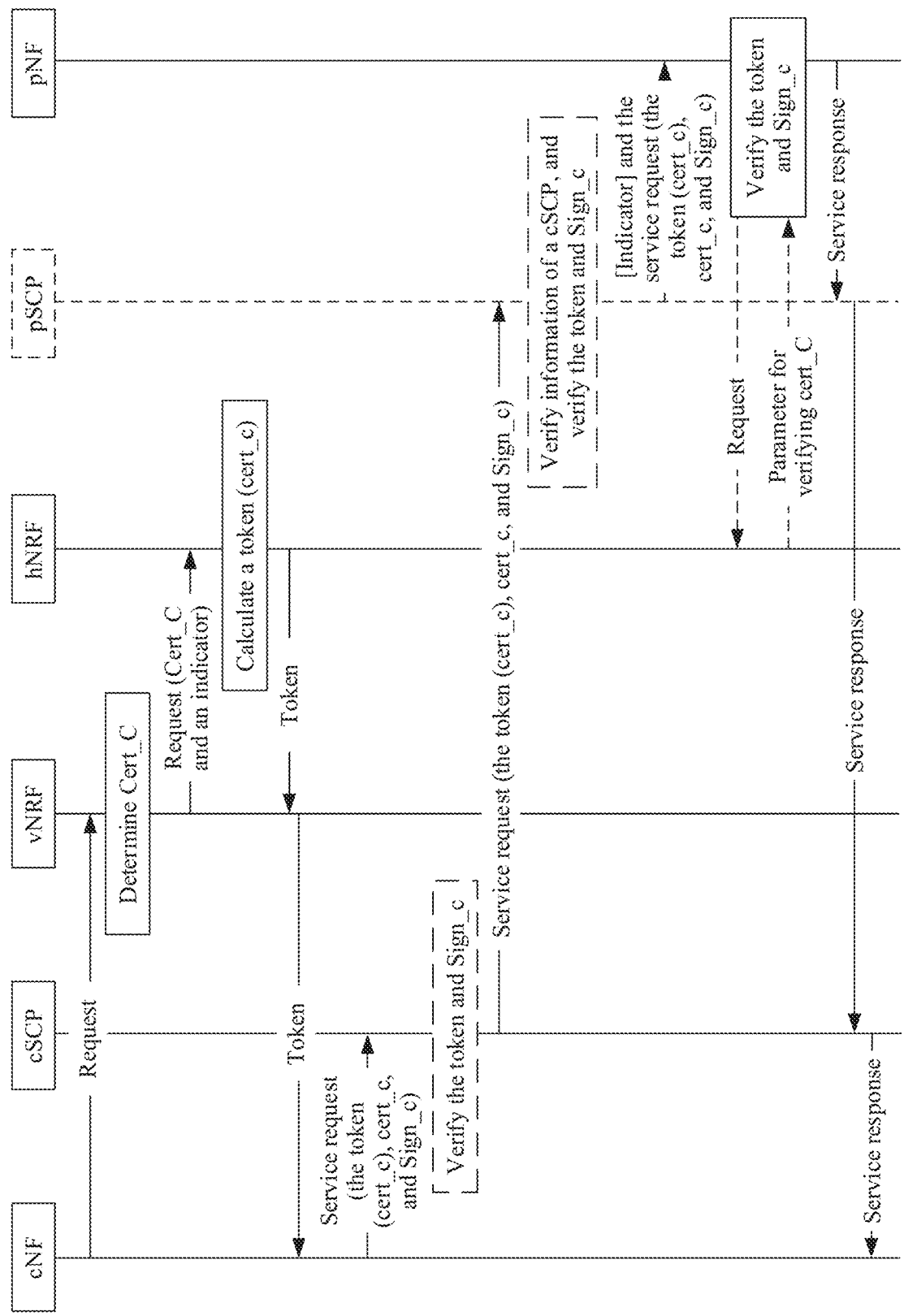
FIG. 19 is a schematic flowchart of another identity verification method for a network function service according to an embodiment of the present invention.

FIG. 19 is a schematic flowchart of another identity verification method for a network function service according to an embodiment of the present invention. A roaming scenario is added in FIG. 19 based on FIG. 18.

A difference between the method described in FIG. 19 and the method described in FIG. 18 is that the pNF may not store a parameter that can be used to verify Cert_C, for example, a root certificate or a root public key. After a token is obtained, the pNF may request from an hNRF or another NF to obtain a parameter for verifying Cert_C, and then verify Cert_C. In addition, another difference is that a cSCP cannot be directly connected to a pSCP during roaming. The cSCP may be connected to the pSCP by using a CSEPP and a pSEPP. Therefore, the pSCP cannot directly obtain a certificate of the cSCP or information of the cSCP, and cannot perform the part of verification performed by the pSCP on the information of the cSCP in FIG. 18.

Herein, the cSEPP may execute the verification content of the pSCP in FIG. 18 because the cSEPP may be directly connected to the cSCP. After the verification succeeds, the cSEPP sends a message to the pSEPP. Optionally, the message may carry a verification success indication. If the verification fails, a processing manner is the same as that used by the pSCP. In addition, the pSEPP may execute a same verification action and a same processing action of the pSCP.

Figure 20:
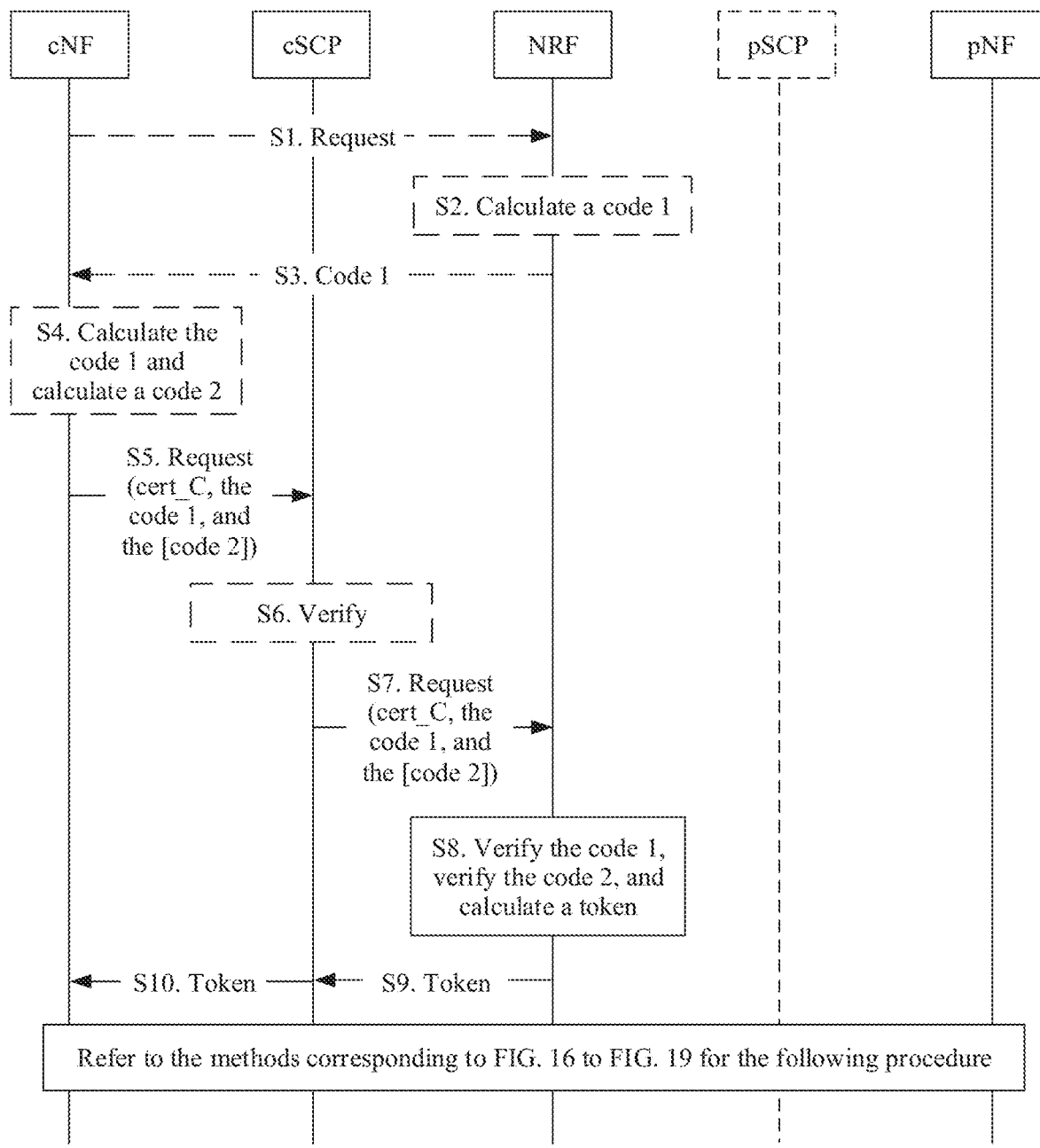
FIG. 20 is a schematic flowchart of another identity verification method for a network function service according to an embodiment of the present invention.

FIG. 20 is a schematic flowchart of another identity verification method for a network function service according to an embodiment of the present invention. An applicable scenario of this embodiment is that a cNF needs to access an NRF by using a cSCP. A procedure after the cNF obtains a token is the same as the procedure in the foregoing embodiment. Herein, in a scenario in which the cNF accesses the NRF by using the cSCP, how the cNF authorizes the cSCP to help the cNF obtain the token from the NRF needs to be supplemented. Specific steps are as follows:

S1. The cNF sends a request. The request includes an instance ID of the cNF. The request may further include information of the cSCP. Herein, the information of the cSCP may be at least one of an identifier of the cSCP, a group ID of the SCP, a set ID of the SCP, an instance ID, an IP address, a MAC address, a subject in a certificate of the cSCP, or the like. Herein, the information of the cSCP may be confirmed through discovery or configured by the cNF. This is not limited. The request message may further carry an FQDN of the cNF and/or a subject in cert_C of the cNF.

The request may further carry information about a slice in which the cNF is located, for example, an NSSAI or an NSI ID.

The request may further carry information about a slice in which the cSCP is located, for example, an NSSAI or an NSI ID.

S2. The NRF calculates a code 1. The code 1 may be a digital signature or a message verification code. Protected content includes at least one of the following:
  the information of the cSCP;
  information of the cNF: at least one of an FQDN, an instance ID of the NF, a group ID of the cNF, and a set ID of the cNF;
  the subject in cert_C of the cNF;
  the information about the slice in which the cNF is located, for example, an NSSAI or an NSI ID; and
  the information about the slice in which the cSCP is located, for example, an NSSAI or an NSI ID.

Herein, the information about the slice in which the cNF is located may also be determined by the NRF based on the information of the cNF. Herein, the information about the slice in which the cSCP is located may also be determined by the NRF based on the information of the cSCP. Herein, the subject in cert_C may be received from the cNF, or may be obtained from the certificate that is of the cNF and that is received from the NRF.

S3. The NRF sends the code 1 to the cNF.

Optionally, the code 1 herein may be alternatively calculated by the cNF. In this case, actions of the NRF in S1, S2, and S3 are not needed. The cNF may directly obtain the code 1 through calculation by using the foregoing parameters based on a private key corresponding to a public key in the certificate of the cNF.

S4. The cNF calculates a code 2. Protected content includes:
  the code 1; and
  a new parameter, for example, a counter.

S5. The cNF sends a token request to the cSCP. The token request carries the code 1 and the code 2. Optionally, the cNF may further send Cert_C.

S6. Optionally, the cSCP establishes a connection to the cNF to obtain Cert_C. The cSCP executes at least one of the following verifications:
  Optionally, verify whether the information of the cSCP in the code 1 in the token request is consistent with information of the cSCP.
  Optionally, verify whether the information of the cNF in the code 1 is consistent with information of the cNF connected to the cSCP.
  Optionally, verify whether an identity of the cNF in Cert_C is consistent with an identity of the cNF in the code 1.
  Optionally, verify correctness of the code 1. If the code 1 is calculated by the NRF, verify the code based on a stored public key of NRF. If the code 1 is calculated by the cNF, verify the code 1 based on Cert_C.
  Optionally, verify correctness of the code 2 based on Cert_C.

After the foregoing verification succeeds, the cSCP continues execution. Otherwise, the cSCP may discard the message, or may send an error code to the cNF to indicate that the verification fails. The error code herein may be alternatively an error code used to indicate specific verification that fails.

S7. The cSCP sends a request to the NRF. The request carries cert_c, the code 1, the code 2, and a new parameter. Optionally, the sent request carries an indication to indicate that the verification in S6 succeeds.

S8. The NRF executes at least one of the following verifications:
  Verify correctness of the code 1. If the code 1 is calculated by the NRF, verify the code based on a stored public key of NRF. If the code 1 is calculated by the cNF, verify the code 1 based on the received Cert_C.
  Optionally, verify whether the information of the cSCP in the code 1 in the token request is consistent with information of the cSCP connected to the NRF.
  Optionally, verify whether an identity of the cNF in Cert_C is consistent with an identity of the cNF in the code 1.
  Optionally, verify correctness of the code 2 based on Cert_C.
  Optionally, verify freshness in the code 2. For example, the counter in the code 2 is greater than a counter corresponding to the local code 1 and/or the information of the cNF. For example, the cNF requests the token by using the code 1 and the code 2 before, and the counter stored in the code 2 by the NRF is 10. Indexing may be performed based on the code 1 or the information of the cNF. After receiving the code 1 and the code 2 again, the counter indexed based on the code 1 or the information of the cNF is greater than 10. Otherwise, the token request is rejected.

Optionally, if an indicator is received, verification work in S8 may be reduced based on the part of verification performed by the pSCP.

S9. If the verification succeeds, the NRF calculates and sends the token to the cSCP. If the verification fails, the NRF may discard the message, or may send, by using the cSCP, an error code to the cNF to indicate that the verification fails. The error code herein may be alternatively an error code used to indicate specific verification that fails.

S10. The cSCP sends the token to the cNF.

For a subsequent procedure, refer to the foregoing embodiment. This is not limited.

It should be noted that the foregoing procedure describes a case in which two codes coexist, that is, the code 1 and the code 2. If the code 1 is calculated by the cNF, this embodiment may include only content of the code 1, and the cNF does not need to calculate the code 2. The part related to the code 2 may also be removed.

Figure 21:
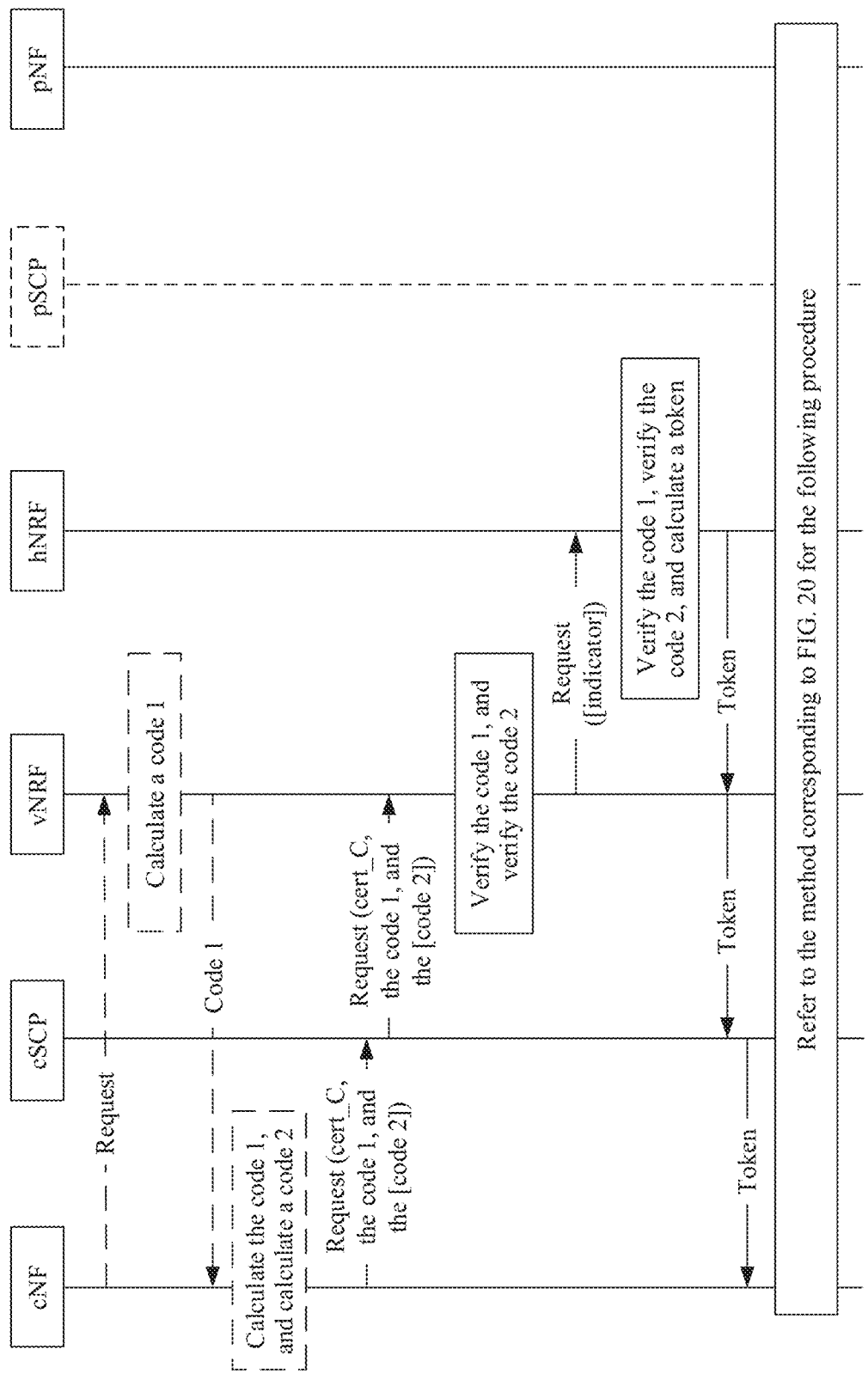
FIG. 21 is a schematic flowchart of another identity verification method for a network function service according to an embodiment of the present invention.

FIG. 21 is a schematic flowchart of another identity verification method for a network function service according to an embodiment of the present invention. A roaming scenario is added in FIG. 21 based on FIG. 20.

Although there are two NRFs: a vNRF and an hNRF, a code 1 is still calculated by the vNRF. In this case, a procedure of the code 1 is the same as that in FIG. 20. When receiving the code 1 and a code 2, the vNRF verifies the code 1 and the code 2. After the verification succeeds, the vNRF sends a token request to the hNRF. The token request does not include cert_C, the code 1, and the code 2. The vNRF may further send a verification success indication to the hNRF, so that the hNRF determines based on the indication that the verification performed by the vNRF succeeds. If the verification performed by the vNRF fails, the vNRF may discard the message, or may send an error code to a cNF to indicate that the verification fails. The error code herein may be alternatively an error code used to indicate specific verification that fails. Finally, the vNRF receives a token from the hNRF, and sends the token to the cNF.

It should be noted that another parameter related to verification on an identity of the cNF is not repeatedly described. This is not limited.

For the foregoing embodiment, a pNF may also request an NRF or another NF to obtain a parameter for verifying Cert_C (for example, a root certificate or a root public key), and then verify Cert_C. In addition, a cSCP and/or a pSCP may also request the NRF or the another NF to obtain the parameter for verifying Cert_C, and then verify Cert_C.

For the foregoing embodiment, the foregoing code (the code 1 or the code 2) includes two parts. One part is a parameter protected by the code, that is, a parameter used to generate the code, for example, information of the cSCP and information of the cNF. The other part is a digital signature or a message verification code that is obtained through calculation.

It should be noted that, when the identity verification includes verification on the token, or includes both verification on the token and verification on Sign, in a scenario in which an SFSF and/or an SEPP exist/exists, the SFSF and/or the SEPP may verify the token. A specific possible description is as follows:

In a possible implementation, if there is only one SFSF between an NF 1 and an NF 2, the SFSF may verify the correctness of Sign. If the verification succeeds, the SFSF sends the token to the NF 2, and the NF 2 verifies the correctness of the token. Alternatively, if the verification succeeds, the SFSF sends the token and Sign to the NF 2, and the NF 2 verifies the correctness of the token and the NF 2 verifies the correctness of Sign again. If the verification on Sign fails, optionally, the SFSF may discard the message. Alternatively, optionally, the SFSF sends an error response, an error indication, or a reject message to the NF 1. Alternatively, optionally, the SFSF may indicate, by using an error response, an error indication, or a reject message, that the verification on Sign fails.

In another possible implementation, the SFSF includes an SFSF 1 on an NF 1 side and an SFSF 2 on an NF 2 side. In this case, after receiving Sign sent by the NF 1, the SFSF 1 verifies Sign with reference to the related embodiments of this specification. If the verification succeeds, the SFSF 1 sends the token to the SFSF 2. In this case, the SFSF 2 sends the token to the NF 2. It is also possible that a cSEPP and a pSEFF are deployed between the two SFSFs. In this case, if the verification succeeds, the token is sent to the cSEPP. The cSEPP sends the token to the NF 2 by using the pSEPP, or the cSEPP sends the token to the NF 2 by using the pSEPP and the SFSF 2. If the verification on Sign fails, optionally, the SFSF 1 may discard the message. Alternatively, optionally, the SFSF 1 sends an error response, an error indication, or a reject message to the NF 1. Alternatively, optionally, the SFSF 1 may indicate, by using an error response, an error indication, or a reject message, that the verification on Sign fails.

In another possible implementation, two SEPPs may be included in a roaming scenario. One SEPP is a cSEPP deployed in a network in which the NF 1 is located, and the other SEPP is a pSEPP deployed in a network in which the NF 2 is located. In this case, after receiving Sign sent by the NF 1, the cSEPP verifies Sign with reference to the foregoing embodiments. If the verification succeeds, the cSEPP sends the token to the pSEPP. In this case, the pSEPP sends the token to the NF 2. If the verification fails, the cSEPP sends an error response, an error indication, or a reject message to the NF 1. If the verification on Sign fails, optionally, the cSEPP may discard the message. Alternatively, optionally, the cSEPP sends an error response, an error indication, or a reject message to the NF 1. Alternatively, optionally, the cSEPP may indicate, by using an error response, an error indication, or a reject message, that the verification on Sign fails. In this case, the cSEPP may filter out an incorrect Sign.

It should be further noted that, for any embodiment described in the present invention, the NF 1 sends certificate information obtained after hash processing to the SFSF or the NRF. The SFSF or the NRF may verify, based on a certificate that is of the NF 1 and that is obtained by itself, whether the certificate information that is obtained after hash processing and that is sent by UE is correct. If the verification fails, the SFSF or the NRF sends an error response, an error indication, or a reject message to the NF 1. If the verification fails, optionally, the SFSF or the NRF may discard the message. Alternatively, optionally, the SFSF or the NRF sends an error response, an error indication, or a reject message to the NF 1. Alternatively, optionally, the SFSF or the NRF may indicate, by using an error response, an error indication, or a reject message, that the verification on the certificate information obtained after the hash processing fails. In this case, the SFSF or the NRF may filter out an incorrect request. If the verification succeeds, execution of other operations continues.

It should be further noted that, for any embodiment described in the present invention, the NF 1 sends certificate information to the SFSF or the NRF. The SFSF or the NRF may verify, based on a certificate that is of the NF 1 and that is obtained by itself, whether the certificate information sent by the UE is correct. If the verification fails, the SFSF or the NRF sends an error response, an error indication, or a reject message to the NF 1. If the verification fails, optionally, the SFSF or the NRF may discard the message. Alternatively, optionally, the SFSF or the NRF sends an error response, an error indication, or a reject message to the NF 1. Alternatively, optionally, the SFSF or the NRF may indicate, by using an error response, an error indication, or a reject message, that the verification on the certificate information fails. In this case, the SFSF or the NRF may filter out an incorrect request. If the verification succeeds, execution of other operations continues.

It should be further noted that, for any embodiment described in the present invention, the NF 1 sends the certificate information to the SFSF or the NRF, so that the NRF can calculate the token or Sign based on the certificate information sent by the NF 1.

It should be further noted that, for any embodiment described above, in a roaming scenario, when the NRF includes a first type of authorization service node: the vNRF and a second type of authorization service node: the hNRF, a form of obtaining the certificate information of the NF 1 from the hNRF may be possibly described as follows:

In a possible implementation, in a scenario in which the NF 1 requests the token from the hNRF by using the vNRF 1, after obtaining the certificate of the NF 1, the vNRF may further send a certificate obtained after hash processing to the hNRF, so that the hNRF receives the certificate obtained after the hash processing.

In another possible implementation, in a scenario in which the NF 1 requests the token from the hNRF by using the vNRF 1, the NF 1 may directly add the certificate information obtained after the hash processing to a request. In this case, the vNRF does not need to perform additional hash conversion, and the hNRF sends, to the hNRF, the request that carries the certificate information obtained after the hash processing. After obtaining the certificate of the NF 1, the vNRF may also verify, based on the certificate of the NF 1, accuracy of the certificate information that is obtained after the hash processing and that is in the request of the NF 1. If the verification fails, the vNRF sends an error response, an error indication, or a reject message to the NF 1. If the verification fails, optionally, the vNRF may discard the message. Alternatively, optionally, the vNRF sends an error response, an error indication, or a reject message to the NF 1. Alternatively, optionally, the vNRF may indicate, by using an error response, an error indication, or a reject message, that the verification on the certificate information obtained after the hash processing fails. In this case, the vNRF may filter out an incorrect request. If the verification succeeds, execution of other operations continues. If the verification succeeds, the request is sent to the hNRF.

In another possible implementation, in a scenario in which the UE requests the token from the hNRF by using the NRF 1, the cSEPP, and the pSEPP, it is also possible that the vNRF sends a certificate to the cSEPP, and the cSEPP sends, to the hNRF, a certificate obtained after hash processing, so that the hNRF receives the certificate obtained after the hash processing.

It should be further noted that, for any embodiment described above, in a roaming scenario, a form of obtaining the certificate information of the NF 1 from the NRF (the NRF may be the vNRF or the hNRF, which is not limited) by using the SFSF may be possibly described as follows:

In a possible implementation, in a scenario in which the NF 1 requests the token from the NRF by using the SFSF, after obtaining the certificate of the NF 1, the SFSF may further send the certificate obtained after the hash processing to the NRF, so that the NRF receives the certificate obtained after the hash processing.

In a possible implementation, in a scenario in which the NF 1 requests the token from the NRF by using the SFSF, the NF 1 may directly add the certificate information obtained after the hash processing to a request. In this case, the SFSF does not need to perform additional hash conversion, and the SFSF sends, to the NRF, the request that carries the certificate information obtained after the hash processing. After obtaining the certificate of the NF 1, the SFSF may also verify, based on the certificate of the NF 1, accuracy of the certificate information that is obtained after the hash processing and that is in the request of the NF 1. If the verification fails, the SFSF sends an error response, an error indication, or a reject message to the NF 1. If the verification fails, optionally, the SFSF may discard the message. Alternatively, optionally, the SFSF sends an error response, an error indication, or a reject message to the NF 1. Alternatively, optionally, the SFSF may indicate, by using an error response, an error indication, or a reject message, that the verification on the certificate information obtained after the hash processing fails. In this case, the SFSF may filter out an incorrect request. If the verification succeeds, execution of other operations continues. If the verification succeeds, the request is sent to the NRF.

In a possible implementation, in a scenario in which the NF 1 requests the token from the hNRF by using the SFSF and the vNRF, it is also possible that the SFSF sends the certificate to the vNRF, and the vNRF sends, to the hNRF, the certificate obtained after the hash processing, so that the hNRF receives the certificate obtained after the hash processing.

It can be learned that, because specific information of the certificate is transmitted in a roaming scenario, privacy of the NF 1 may be disclosed, for example, an IP address of the NF 1 is disclosed, or an FQDN is disclosed. In the present invention, through the foregoing processing, it may be implemented that in the roaming scenario, the hNRF can obtain information of the certificate without disclosing specific content of the certificate to the hNRF. In addition, by implementing this embodiment of the present invention, even through the NF 1 is not directly connected to the NRF by using a logical link, another network element (for example, the SFSF, the SEPP, or the vNRF) or the like may be used to obtain the certificate information of the NF 1, to complete calculation of the token or Sign.

For all the embodiments of the present invention, the certificate information carried in the token may be any combination of parameters in the certificate, for example, the identity of the NF 1 to which the certificate is issued, the NF type, or an identity for the issued certificate. This is not limited.

For all the embodiments of the present invention, the parameter input for calculating Sign may be any combination of parameters in the certificate, for example, the identity of the NF 1 to which the certificate is issued, the NF type, or an identity for the issued certificate. This is not limited.

The foregoing describes in detail the methods in the embodiments of the present invention. The following provides related apparatuses in the embodiments of the present invention.

Figure 11:
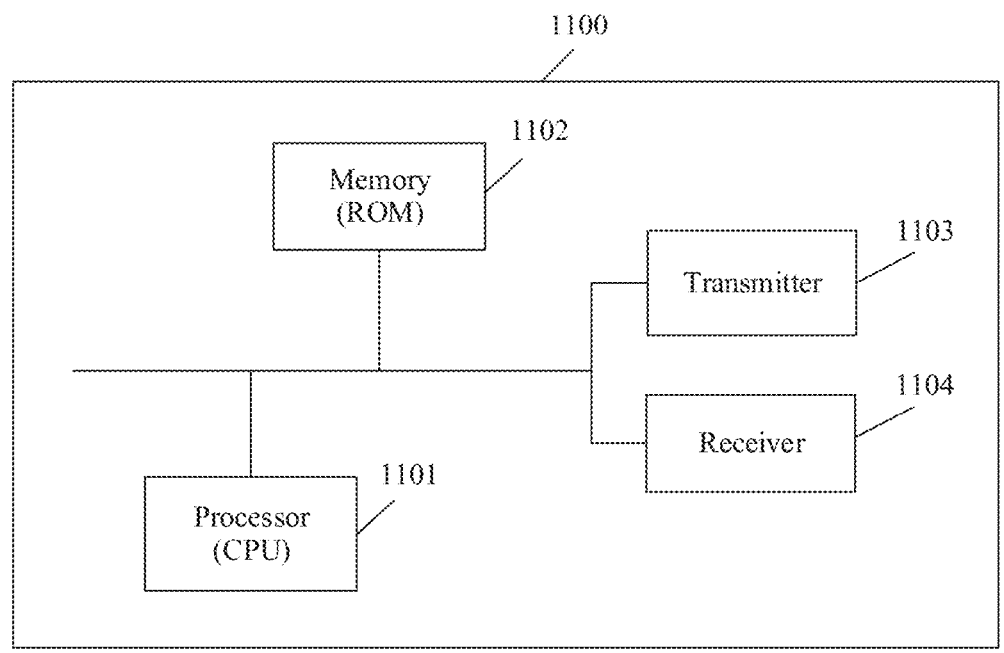
FIG. 11 is a schematic structural diagram of a device according to an embodiment of the present invention.

Referring to FIG. 11, an embodiment of the present invention provides a network element 1100. The network element includes a processor 1101, a memory 1102, a transmitter 1103, and a receiver 1104. The processor 1101, the memory 1102, the transmitter 1103, and the receiver 1104 are connected (for example, the processor 1101, the memory 1102, the transmitter 1103, and the receiver 1104 are connected to each other by using a bus; or some or all of the parts thereof may be coupled together).

The memory 1102 includes but is not limited to a random access memory (Random Access Memory, RAM), a read-only memory (Read-Only Memory, ROM), an erasable programmable read-only memory (Erasable Programmable Read Only Memory, EPROM), or a compact disc read-only memory (Compact Disc Read-Only Memory, CD-ROM). The memory 1102 is configured to store a related instruction and data (for example, a token or a certificate).

The transmitter 1103 is configured to transmit data, and the receiver 1104 is configured to receive data.

The processor 1101 may be one or more central processing units (Central Processing Unit, CPU). When the processor 1101 is one CPU, the CPU may be a single-core CPU, or may be a multi-core CPU.

The processor 1101 is configured to read program code stored in the memory 1102, to implement functions of any network element in the embodiments shown in FIG. 4 to FIG. 10.

Specifically, when the network element 1100 is a first network element, the program code stored in the memory 1102 is specifically used to implement functions of the first network element in the embodiment of FIG. 4.

Specifically, when the network element 1100 is a second network element, the program code stored in the memory 1102 is specifically used to implement functions of the second network element in the embodiment of FIG. 4.

Specifically, when the network element 1100 is a network element in which an NF 1 is located, the program code stored in the memory 1102 is specifically used to implement functions of the NF 1 in any embodiment of the embodiments of FIG. 5 to FIG. 10 and the embodiments of FIG. 14 and FIG. 15.

Specifically, when the network element 1100 is a network element in which an NF 2 is located, the program code stored in the memory 1102 is specifically used to implement functions of the NF 2 in any embodiment of the embodiments of FIG. 5 to FIG. 10 and the embodiments of FIG. 14 and FIG. 15.

Specifically, when the network element 1100 is a network element in which an NRF is located, the program code stored in the memory 1102 is specifically used to implement functions of the NRF in any embodiment of the embodiments of FIG. 5 to FIG. 10 and the embodiments of FIG. 14 and FIG. 15.

Specifically, when the network element 1100 is a network element in which an SFSF is located, the program code stored in the memory 1102 is specifically used to implement functions of the SFSF in the embodiment of FIG. 8 or FIG. 9, or another related embodiment.

Figure 12:
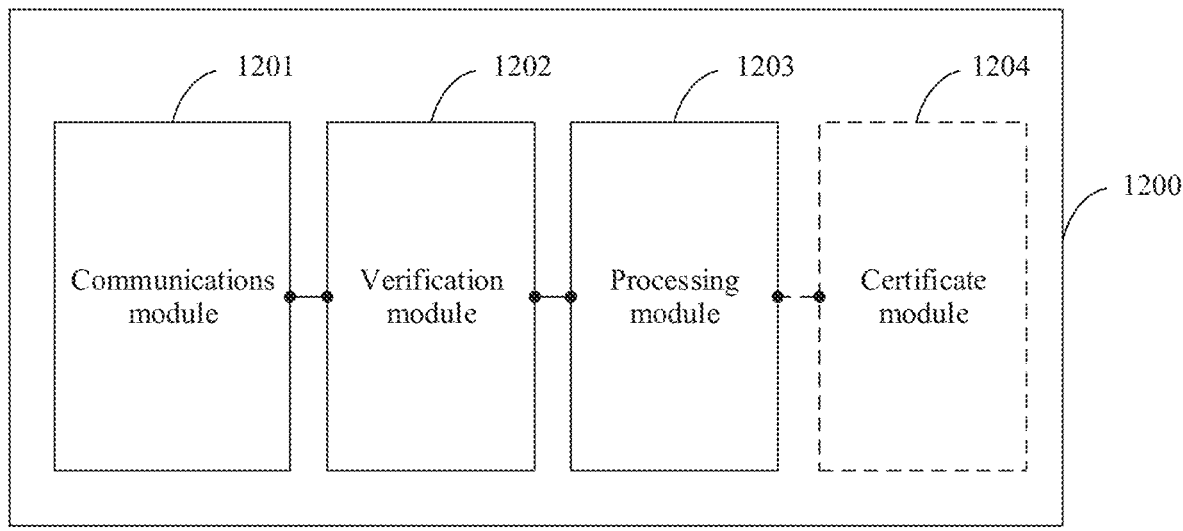
FIG. 12 is a schematic structural diagram of an apparatus according to an embodiment of the present invention.

Referring to FIG. 12, based on a same inventive concept, an embodiment of the present invention provides an apparatus 1200. The apparatus 1200 may include a communications module 1201, a verification module 1202, and a processing module 1203.

The communications module 1201 is configured to receive a network function (NF) service request from a first network element. The NF service request includes a token (token). The token includes first certificate information.

The verification module 1202 is configured to verify the first certificate information to determine whether an identity represented by the first certificate information is consistent with an identity of the first network element.

The processing module 1203 is configured to: when it is determined that the identity represented by the first certificate information is inconsistent with the identity of the first network element, reject, by the second network element, the NF service request.

In a possible embodiment, the processing module 1203 is further configured to: when it is determined that the identity represented by the first certificate information is consistent with the identity of the first network element, continue to process the NF service request.

In a possible embodiment, the apparatus further includes a certificate module 1204. The certificate module 1204 is configured to generate second certificate information based on a certificate of the first network element. The verification module 1202 is specifically configured to verify whether the first certificate information is the same as the second certificate information.

In a possible embodiment, the first certificate information includes an identifier of a requester of the token, and the second certificate information includes an identifier of the first network element. The verification module 1202 is specifically configured to verify whether the identifier of the requester of the token is the same as the identifier of the first network element.

In a possible embodiment, the first certificate information includes an NF type of a requester of the token, and the second certificate information includes an NF type of the first network element. The verification module 1202 is specifically configured to verify whether the NF type of the requester of the token is the same as the NF type of the first network element.

In a possible embodiment, the first network element is a requester of a service, and the second network element is a first control plane network element. The first certificate information includes an identifier or an NF type of a requester of the token. The certificate module 1204 is specifically configured to generate fourth certificate information based on the certificate of the first network element. The verification module 1202 is specifically configured to: verify whether the first certificate information is the same as the fourth certificate information; and if a verification result is that the first certificate information is the same as the fourth certificate information, determine that the identity of the requester of the token is consistent with the identity of the first network element.

In a possible embodiment, the communications module 1201 is further configured to: when it is determined that the identity of the requester of the token is consistent with the identity of the second network element, forward the NF service request to a network element that serves as a service provider.

For specific implementation of the function modules in the apparatus 1200, refer to the related descriptions of FIG. 4 to FIG. 10. Details are not described herein again.

Figure 13:
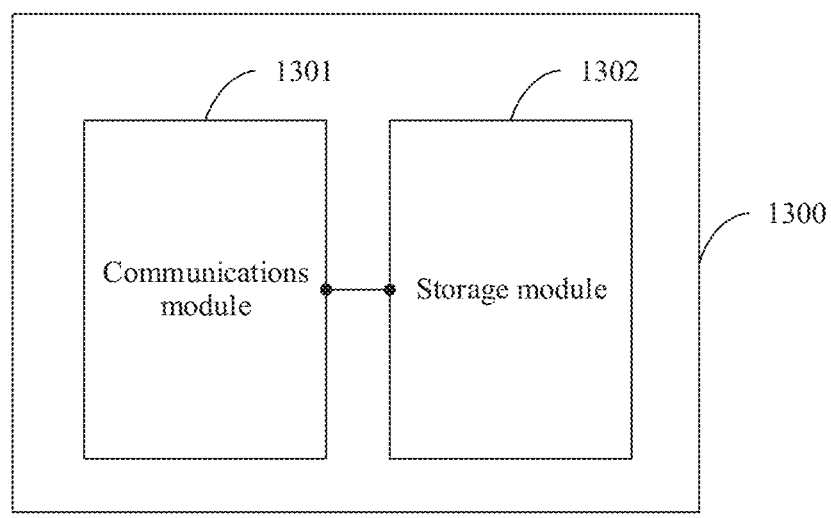
FIG. 13 is a schematic structural diagram of another apparatus according to an embodiment of the present invention.

Referring to FIG. 13, based on a same inventive concept, an embodiment of the present invention provides an apparatus 1300. The apparatus 1300 may include a communications module 1301 and a storage module 1302.

The communications module 1301 is configured to obtain a token (token) corresponding to an NF service. The token includes first certificate information of a requester of the token.

The storage module 1302 is configured to store the token.

The communications module 1301 is further configured to send an NF service request to a second network element. The NF service request includes the token. The token is used to trigger the second network element to determine whether an identity represented by the first certificate information is consistent with an identity of the first network element.

The communications module 1301 is further configured to: when the identity of the requester of the token is inconsistent with an identity of the second network element, receive a reject message from the second network element.

In a possible embodiment, the communications module 1301 is further configured to:

when the identity represented by the first certificate information is consistent with the identity of the first network element, receive an NF service response from the second network element.

In a possible embodiment, the token is specifically used to trigger the second network element to determine whether the first certificate information is the same as second certificate information. The second certificate information is generated by the second network element based on a certificate of the first network element.

In a possible embodiment, the first certificate information includes an identifier of the requester of the token, and the second certificate information includes an identifier of the first network element. The token is specifically used to trigger the second network element to determine whether the identifier of the requester of the token is the same as the identifier of the first network element.

In a possible embodiment, the first certificate information includes an NF type of the requester of the token, and the second certificate information includes an NF type of the first network element. The token is specifically used to trigger the second network element to determine whether the NF type of the requester of the token is the same as the NF type of the first network element.

In a possible embodiment, the first network element is a requester of a service, and the second network element is a first control plane network element. The first certificate information includes an identifier or an NF type of the requester of the token. The token is specifically used to trigger the first control plane network element to determine whether the first certificate information is the same as fourth certificate information. The fourth certificate information is generated by the first control plane network element based on a certificate of the first network element.

In a possible embodiment, the first network element is a requester of the token. The communications module 1301 is specifically configured to: send a token obtaining request to a second control plane network element; and receive the token returned by the second control plane network element. The first certificate information in the token is generated by the second control plane network element based on the certificate of the first network element.

For specific implementation of the function modules in the apparatus 1300, refer to the related descriptions of FIG. 4 to FIG. 10. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, all or a part of the procedures or functions are generated according to the embodiments of the present invention. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

In the foregoing embodiments, the description of each embodiment has respective focuses. For a part that is not described in detail in an embodiment, refer to related descriptions in other embodiments.

The invention claimed is:

1. An identity verification method performed by a managing network element in a service network, comprising:
receiving, via the service network, a network function (NF) service request from a requesting network element in the service network, wherein the NF service request comprises a service token for a first NF service provided by the managing network element, the service token is provided by a service token server of the service network for the first NF service and comprises first certificate information, wherein the first certificate information is related to a certificate of a requester of the service token and comprises identity information of the requester of the service token as used in the certificate of the requester of the service token, wherein the managing network element is a control plane network element of the service network, and the first certificate information comprises an identifier or an NF type of the requester of the service token;
obtaining, via the service network, a certificate of the requesting network element;
determining-whether the identity information of the requester of the service token in the first certificate information is consistent with identity information of the requesting network element in the certificate of the requesting network element; and
upon determining that the identity information of the requester of the service token in the first certificate information is inconsistent with the identity information of the requesting network element in the certificate of the requesting network element, rejecting the NF service request.

2. The method according to claim 1, wherein the identity information of the requester of the service token in the first certificate information comprises an identifier of the requester of the service token, and the identity information in the certificate of the requesting network element comprises an identifier of the requesting network element.

3. The method according to claim 1, wherein the first certificate information comprises an NF type of the requester of the service token, and the certificate of the requesting network element indicates an NF type of the requesting network element.

4. A requester identity verification method performed by a requesting network element in a service network, comprising:

obtaining, from a service token server in the service network, a service token corresponding to a first NF service provided by a managing network element in the service network, wherein the service token comprises first certificate information related to a certificate of a requester of the service token and comprising identity information of the requester of the service token as used in the certificate of the requester of the service token, wherein the managing network element is a control plane network element of the service network, and the first certificate information comprises an identifier or an NF type of the requester of the service token;

sending an NF service request for the first NF service to the managing network element, wherein the NF service request comprises the service token; and receiving a reject message from the managing network element, wherein receiving the reject message indicates that the managing network element fails to verify the requesting network element based on the service token in the NF service request.

5. The method according to claim 4, wherein the identity information in the first certificate information comprises an identifier of the requester of the service token.

6. The method according to claim 4, wherein the identity information in the first certificate information comprises an NF type of the requester of the service token.

7. The method according to claim 4, wherein the step of obtaining the service token corresponding to the first NF service comprises:

sending a token obtaining request to the service token server in a control plane network of the service network; and receiving, by the requesting network element, the service token returned by the service token server.

8. A network element in a service network comprising:
a transceiver for network communications;
a memory storing executable instructions;
a processor configured to execute the executable instructions to:

receive, via the service network, a network function (NF) service request for a first NF service from a requesting network element in the service network, wherein the NF service request comprises a service token provided by a service token server of the service network for the first NF service, the service token comprises first certificate information related to a certificate of a requester of the service token and comprising identity information of the requester of the service token as used in the certificate of the requester of the service token, wherein the network element is a control plane network element of the service network, and the first certificate information comprises an identifier or an NF type of the requester of the service token;

obtaining, via the service network, a certificate of the requesting network element;

determine whether the identity information of the requester of the service token in the first certificate information is consistent with identity information of the requesting network element in the certificate of the requesting network element; and upon determining that the identity information of the requester in the service token in the first certificate information is inconsistent with the identity information of the requesting network element in the certificate of the requesting network element, reject the NF service request.

9. The network element according to claim 8, wherein the processor is further configured to:

process the NF service request when the identity information of the requester of the service token in represented by the first certificate information is consistent with the identity information of the requesting network element in the certificate of the requesting network element.

10. The network element according to claim 8, wherein identify information in the first certificate information comprises an identifier of the requester of the service token, and the identity information in the certificate of the requesting network element comprises an identifier of the requesting network element.

11. The network element according to claim 8, wherein the identify information in the first certificate information comprises an NF type of the requester of the service token, and the identify information of the requesting network element in the certificate of the requesting network element.

* * * * *